(12) United States Patent
Wang et al.

(10) Patent No.: US 11,774,718 B2
(45) Date of Patent: Oct. 3, 2023

(54) OPTICAL IMAGING LENS ASSEMBLY

(71) Applicant: Zhejiang Sunny Optical Co., Ltd, Ningbo (CN)

(72) Inventors: Jian Wang, Ningbo (CN); Lingbo He, Ningbo (CN); Fujian Dai, Ningbo (CN); Liefeng Zhao, Ningbo (CN)

(73) Assignee: Zhejiang Sunny Optical Co., Ltd

( * ) Notice: Subject to any disclaimer, the term of this patent is extended or adjusted under 35 U.S.C. 154(b) by 455 days.

(21) Appl. No.: 17/012,335

(22) Filed: Sep. 4, 2020

(65) Prior Publication Data
US 2021/0096331 A1    Apr. 1, 2021

(30) Foreign Application Priority Data

Sep. 27, 2019   (CN) .......................... 201910922073.9

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ...... G02B 13/0045; G02B 9/64; G02B 13/00; G02B 13/18; G02B 13/15; G02B 13/14; G02B 5/005; G02B 5/208; G02B 27/0025
See application file for complete search history.

(56) References Cited

U.S. PATENT DOCUMENTS

| | | | |
|---|---|---|---|
| 2007/0188885 A1* | 8/2007 | Kawakami | G02B 15/143503 359/680 |
| 2014/0240851 A1* | 8/2014 | Kawamura | G02B 9/64 359/708 |
| 2014/0268367 A1* | 9/2014 | Kawamura | G02B 13/18 359/708 |
| 2016/0124184 A1 | 5/2016 | Tang et al. | |
| 2016/0341929 A1 | 11/2016 | Liu et al. | |
| 2020/0393653 A1* | 12/2020 | Chen | G02B 13/0045 |

FOREIGN PATENT DOCUMENTS

CN    108761730 A * 11/2018 ......... G02B 13/0045

OTHER PUBLICATIONS

Office Action from Intellectual Property of India for Application No. 202014038773, dated Dec. 1, 2021, 5 pages.

* cited by examiner

*Primary Examiner* — James C. Jones
(74) *Attorney, Agent, or Firm* — Barnes & Thornburg LLP

(57) ABSTRACT

An optical imaging lens assembly is provided. The optical imaging lens assembly includes, sequentially from an object side to an image side along an optical axis, a first lens having negative refractive power with a concave object-side surface and a concave image-side surface; a second lens having refractive power; a third lens having negative refractive power; a fourth lens having refractive power; a fifth lens having refractive power; a sixth lens having refractive power with a concave object-side surface and a concave image-side surface; a seventh lens having refractive power; and an eighth lens having refractive power.

18 Claims, 12 Drawing Sheets

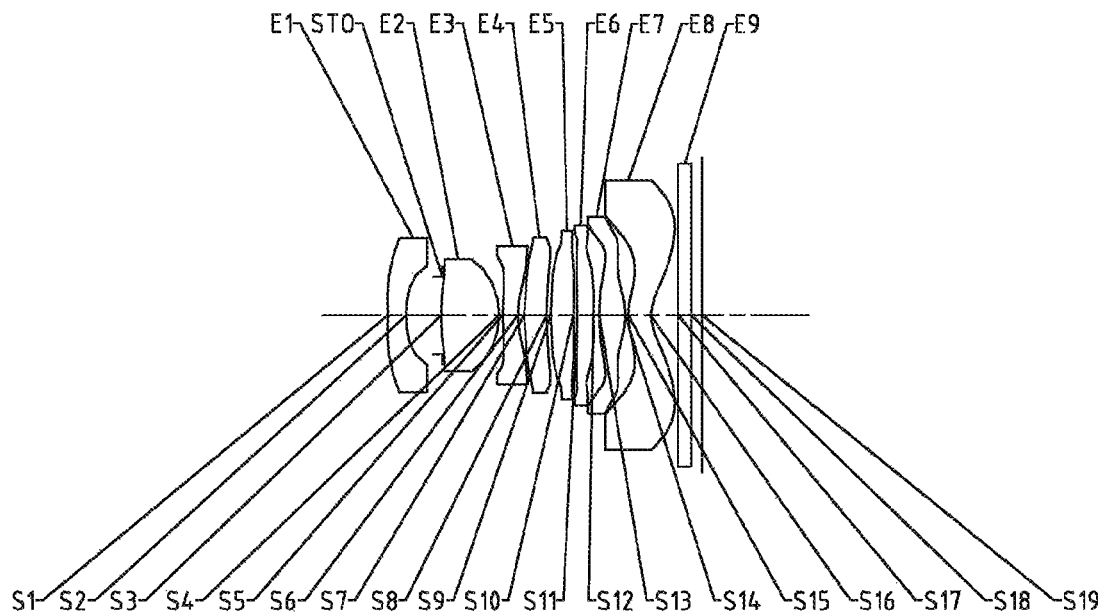
Fig. 5
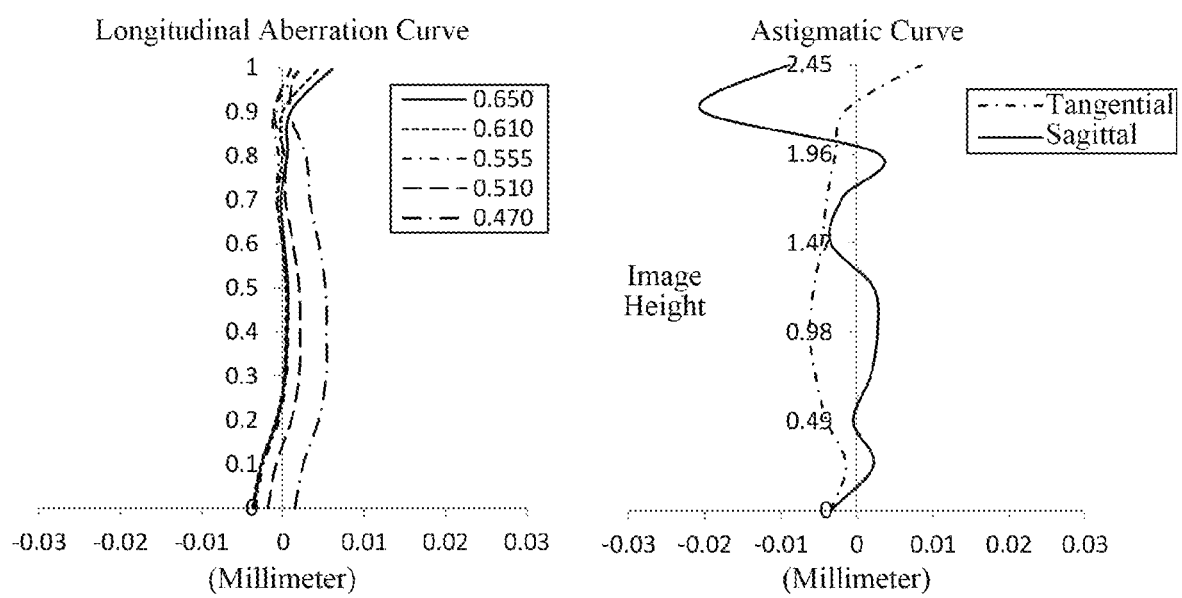
Fig. 6A
Fig. 6B

OPTICAL IMAGING LENS ASSEMBLY

CROSS-REFERENCE TO RELATED APPLICATION

This application claims benefit of priority to Chinese Patent Application No. 201910922073.9 filed on Sep. 27, 2019 before the China National Intellectual Property Administration, the entire disclosure of which is incorporated herein by reference in its entity.

TECHNICAL FIELD

The present disclosure relates to the field of optical elements, and specifically, relates to an optical imaging lens assembly.

BACKGROUND

With the advancement of science and technology, the portable electronic product, such as smart phone and tablet computer, has gained rapid popularity due to their portable characteristics. People have put forward higher requirements on the miniaturization of the optical imaging lens assembly mounted on the portable electronic product, and have put forward higher and higher requirements on the image quality of optical imaging lens assemblies.

As the performance of CCD and CMOS image sensors increases and the size thereof further reduces, the image quality of the corresponding optical imaging lens assembly needs to be further improved. In the currently emerging dual-camera technology, in addition to the characteristics of high pixels, high resolution, and high relative brightness, the camera lens assembly used in the mobile phone is also required to have a larger field of view and aperture.

SUMMARY

The present disclosure provides an optical imaging lens assembly which includes, sequentially from an object side to an image side along an optical axis, a first lens having negative refractive power with a concave object-side surface and a concave image-side surface; a second lens having refractive power; a third lens having negative refractive power; a fourth lens having refractive power; a fifth lens having refractive power; a sixth lens having refractive power with a concave object-side surface and a concave image-side surface; the seventh lens having refractive power; and the eighth lens having refractive power.

In one embodiment, a total effective focal length f of the optical imaging lens assembly and an entrance pupil diameter EPD of the optical imaging lens assembly may satisfy: $f/EPD \leq 1.8$.

In one embodiment, half of a maximal field-of-view Semi-FOV of the optical imaging lens assembly may satisfy: Semi-HFOV$\geq 60°$.

In one embodiment, a total effective focal length f of the optical imaging lens assembly, an effective focal length f2 of the second lens and an effective focal length f6 of the sixth lens may satisfy: $-3.5 < (f6+f2)/f < -1.0$.

In one embodiment, an effective focal length f1 of the first lens and a total effective focal length f of the optical imaging lens assembly may satisfy: $-2.5 < f1/f < -2.0$.

In one embodiment, a total effective focal length f of the optical imaging lens assembly and an effective focal length f3 of the third lens may satisfy: $-3.0 < f3/f < -2.0$.

In one embodiment, a total effective focal length f of the optical imaging lens assembly and an effective focal length f6 of the sixth lens may satisfy: $-4.5 < f6/f < -2.0$.

In one embodiment, an effective focal length f7 of the seventh lens and an effective focal length f8 of the eighth lens may satisfy: $1.0 \leq |f8|/f7 \leq 1.5$.

In one embodiment, a radius of curvature R14 of an image-side surface of the seventh lens, a radius of curvature R15 of an object-side surface of the eighth lens and a radius of curvature R16 of an image-side surface of the eighth lens may satisfy: $-2.5 < (R15+R16)/R14 < -1.0$.

In one embodiment, a radius of curvature R1 of the object-side surface of the first lens, a radius of curvature R2 of the image-side surface of the first lens and a radius of curvature R3 of an object-side surface of the second lens may satisfy: $1.0 < |R1|/(R2+R3) < 1.5$.

In one embodiment, a radius of curvature R4 of an image-side surface of the second lens, a radius of curvature R5 of an object-side surface of the third lens and a radius of curvature R6 of an image-side surface of the third lens may satisfy: $0.5 < R6/(R4+R5) < 1.0$.

In one embodiment, a spaced interval T12 between the first lens and the second lens along the optical axis and a sum of spaced intervals $\Sigma AT$ along the optical axis of each two adjacent lenses from the first lens to the eighth lens may satisfy: $0 < T12/\Sigma AT < 1.0$.

In one embodiment, a center thickness CT1 of the first lens along the optical axis and a center thickness CT2 of the second lens along the optical axis may satisfy: $2.5 < CT2/CT1 < 3.5$.

Through the above configuration, the optical imaging lens assembly according to the present disclosure may have at least one beneficial effect such as a large aperture, high pixels, large field-of-view, and high image quality and the like.

BRIEF DESCRIPTION OF THE DRAWINGS

Other features, objects, and advantages of the present disclosure will become more apparent by reading the detailed description of the non-limiting embodiments with reference to the accompanying drawings:

FIG. 5 illustrates a schematic structural view of an optical imaging lens assembly according to example 3 of the present disclosure;

FIGS. 6A to 6D illustrate a longitudinal aberration curve, an astigmatic curve, a distortion curve, and a lateral color curve of the optical imaging lens assembly of the example 3, respectively;

DETAILED DESCRIPTION OF EMBODIMENTS

Figure 1:
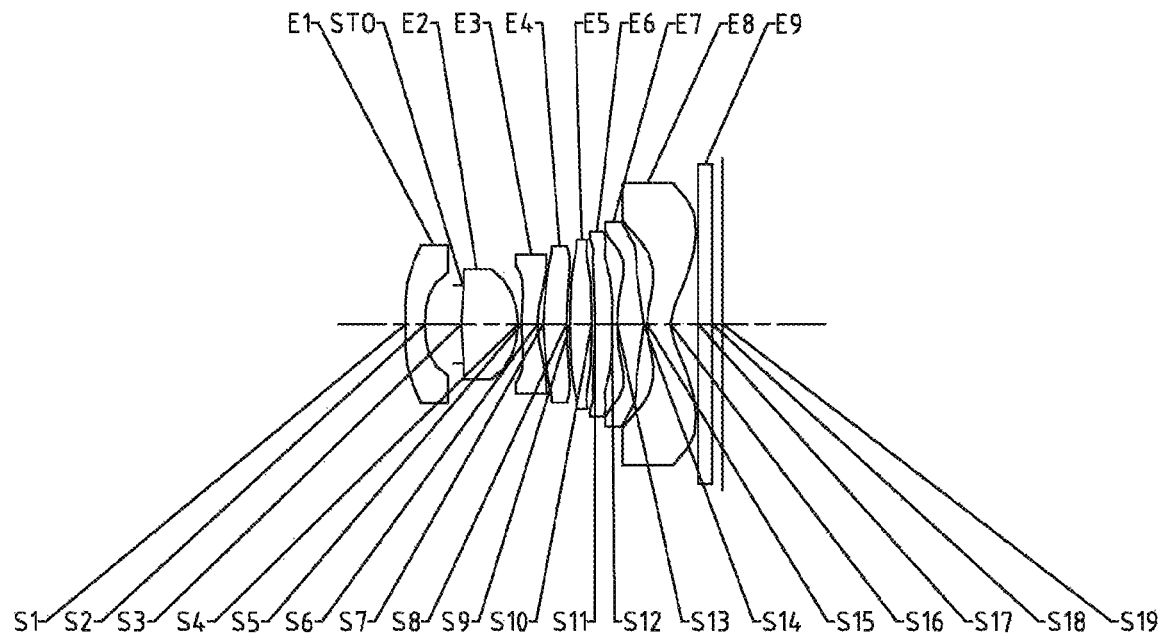
FIG. 1 illustrates a schematic structural view of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include eight lenses having refractive power, which are a first lens, a second lens, a third lens, a fourth lens, a fifth lens, a sixth lens, a seventh lens and an eighth lens, respectively. The eight lenses are arranged sequentially from an object side to an image side along an optical axis. Among the first lens to the eighth lens, there may be a spaced interval between each two adjacent lenses.

In an exemplary embodiment, the first lens may have negative refractive power, an object-side surface thereof may be a concave surface, and an image-side surface thereof may be a concave surface; the second lens has positive or negative refractive power; the third lens may have negative refractive power; the fourth lens has positive or negative refractive power; the fifth lens has positive or negative refractive power; the sixth lens has positive or negative refractive power, an object-side surface thereof may be a concave surface, and an image-side surface thereof may be a concave surface; the seventh lens has positive or negative refractive power; and the eighth lens has positive or negative refractive power.

Reasonably configuring the refractive power and surface shape of the first lens may ensure that the first lens has good workability and make the optical imaging lens assembly have the advantage of a large field-of-view. Reasonably configuring the refractive power of the third lens to make the third lens have negative refractive power is beneficial to reducing the off-axis aberration of the optical imaging lens assembly, thereby improving the image quality. Reasonably configuring the surface shape of the sixth lens is beneficial to reducing the incident angle of off-axis light in the optical imaging lens assembly, so as to reduce the tolerance sensitivity of the optical imaging lens assembly.

In an exemplary embodiment, the optical imaging lens assembly according to the present disclosure may satisfy: f/EPD≤1.8, where f is a total effective focal length of the optical imaging lens assembly, and EPD is an entrance pupil diameter of the optical imaging lens assembly. When f/EPD≤1.8 is satisfied, the optical imaging lens assembly may achieve the advantages of large aperture, and has good image quality even in dark environment.

In an exemplary embodiment, the optical imaging lens assembly according to the present disclosure may satisfy: Semi-HFOV≥60°, where Semi-FOV is half of a maximal field-of-view of the optical imaging lens assembly. Satisfying Semi-HFOV≥60° may be beneficial for the optical imaging lens assembly to obtaining a larger field-of-view, thereby improving the ability of the optical imaging lens assembly to collect object information.

In an exemplary embodiment, the optical imaging lens assembly according to the present disclosure may satisfy: −3.5<(f6+f2)/f<−1.0, where f is a total effective focal length of the optical imaging lens assembly, f2 is an effective focal length of the second lens, and f6 is an effective focal length of the sixth lens. When −3.5<(f6+f2)/f<−1.0 is satisfied, the spherical aberration contributed by the second lens and the sixth lens may be reasonably controlled within a reasonable range, so that the on-axis field-of-view may obtain good image quality.

In an exemplary embodiment, the optical imaging lens assembly according to the present disclosure may satisfy: −2.5<f1/f<−2.0, where f1 is an effective focal length of the first lens, and f is a total effective focal length of the optical imaging lens assembly. Satisfying −2.5<f1/f<−2.0 may reduce the deflection angle of the light, thereby improving the image quality of the optical imaging lens assembly.

In an exemplary embodiment, the optical imaging lens assembly according to the present disclosure may satisfy: −3.0<f3/f<−2.0, where f is a total effective focal length of the optical imaging lens assembly, and f3 is an effective focal length of the third lens. When −3.0<f3/f<−2.0 is satisfied, the on-axis spherical aberration generated by the third lens may be constrained in a reasonable range, thereby ensuring the image quality of the on-axis field-of-view.

In an exemplary embodiment, the optical imaging lens assembly according to the present disclosure may satisfy: −4.5<f6/f<−2.0, where f is a total effective focal length of the optical imaging lens assembly, and f6 is an effective focal length of the sixth lens. Satisfying −4.5<f6/f<−2.0 may make the sixth lens generate positive spherical aberration, which is compensated with the negative spherical aberration generated by other lenses of the optical imaging lens assembly, so that the optical imaging lens assembly has a good imaging quality in the on-axis area.

In an exemplary embodiment, the optical imaging lens assembly according to the present disclosure may satisfy: 1.0≤|f8|/f7≤1.5, where f7 is an effective focal length of the seventh lens, and f8 is an effective focal length of the eighth lens. Satisfying 1.0≤|f8|/f7≤1.5 is beneficial to compensating the off-axis aberration of the optical imaging lens assembly.

In an exemplary embodiment, the optical imaging lens assembly according to the present disclosure may satisfy: −2.5<(R15+R16)/R14<−1.0, where R14 is a radius of curvature of an image-side surface of the seventh lens, R15 is a radius of curvature of an object-side surface of the eighth lens, and R16 is a radius of curvature of an image-side surface of the eighth lens. Satisfying −2.5<(R15+R16)/R14<−1.0 may effectively eliminate the spherical aberration of the optical imaging lens assembly, thereby obtaining a high-definition image.

In an exemplary embodiment, the optical imaging lens assembly according to the present disclosure may satisfy: 1.0<|R1|/(R2+R3)<1.5, where R1 is a radius of curvature of the object-side surface of the first lens, R2 is a radius of curvature of the image-side surface of the first lens, and R3 is a radius of curvature of an object-side surface of the second lens. When 1.0<|R1|/(R2+R3)<1.5 is satisfied, the optical imaging lens assembly may better achieve the deflection of the optical path.

In an exemplary embodiment, the optical imaging lens assembly according to the present disclosure may satisfy: 0.5<R6/(R4+R5)<1.0, where R4 is a radius of curvature of an image-side surface of the second lens, R5 is a radius of curvature of an object-side surface of the third lens, and R6 is a radius of curvature of an image-side surface of the third lens. Satisfying 0.5<R6/(R4+R5)<1.0 may be beneficial to ensuring the CRA matching of the optical imaging lens assembly and correcting the field curvature of the optical imaging lens assembly, and thereby meet the imaging clarity requirements of each field-of-view.

In an exemplary embodiment, the optical imaging lens assembly according to the present disclosure may satisfy: 0<T12/ΣAT<1.0, where T12 is a spaced interval between the first lens and the second lens along the optical axis, and ΣAT is a sum of spaced intervals along the optical axis of each two adjacent lenses from the first lens to the eighth lens. More specifically, T12 and ΣAT may further satisfy: 0.3<T12/ΣAT<0.8. Satisfying 0<T12/ΣAT<1.0 may effectively reduce the interval sensitivity of the optical imaging lens assembly, thus correcting field curvature of the lens assembly.

In an exemplary embodiment, the optical imaging lens assembly according to the present disclosure may satisfy: 2.5<CT2/CT1<3.5, where CT1 is a center thickness of the first lens along the optical axis, and CT2 is a center thickness of the second lens along the optical axis. More specifically, CT1 and CT2 may further satisfy: 2.8<CT2/CT1<3.5. When 2.5<CT2/CT1<3.5 is satisfied, the distortion contributed by each field-of-view of the optical imaging lens assembly may be controlled within a reasonable range, thereby improving the image quality.

In an exemplary embodiment, the optical imaging lens assembly according to the present disclosure further includes a stop disposed between the first lens and the second lens. Optionally, the above optical imaging lens assembly may further include an optical filter for correcting the color deviation and/or a protective glass for protecting the photosensitive element located on an imaging plane.

The optical imaging lens assembly according to the above embodiments of the present disclosure may employ a plurality of lenses, such as eight lenses as described above. By properly configuring the refractive power of each lens, the surface shape, the center thickness of each lens, and spaced intervals along the optical axis between the lenses, the size of the optical imaging lens assembly may be effectively reduced, and the workability of the optical imaging lens assembly may be improved, such that the optical imaging lens assembly is more advantageous for production processing and may be applied to portable electronic products. The optical imaging lens assembly configured as described above may have characteristics such as large aperture, high relative brightness, large field-of-view, and good image quality.

In the embodiments of the present disclosure, at least one of the surfaces of lenses is aspheric, that is, at least one of the object-side surface of the first lens to the image-side surface of the eighth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of reducing distortion aberration and reducing astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens, the seventh lens and an eighth lens is aspheric. Optionally, the object-side surface and the image-side surface of each of the first lens, the second lens, the third lens, the fourth lens, the fifth lens, the sixth lens, the seventh lens and an eighth lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking eight lenses as an example, the optical imaging lens assembly is not limited to include eight lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 shows a schematic structural view of the optical imaging lens assembly according to example 1 of the present disclosure.

As shown in FIG. 1, the optical imaging lens assembly includes a first lens E1, a stop STO, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a concave surface, and an image-side surface S12 thereof is a concave surface. The seventh lens E7 has positive refractive power, an object-side surface S13 thereof is a convex surface, and an image-side surface S14 thereof is a convex surface. The eighth lens E8 has positive refractive power, an object-side surface S15 thereof is a convex surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

Table 1 is a table illustrating basic parameters of the optical imaging lens assembly of example 1, wherein the units for the radius of curvature, the thickness/distance and the focal length are millimeter (mm).

TABLE 1

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | 700.0000 | | | | |
| S1 | Aspheric | −8.3130 | 0.2900 | 1.54 | 55.6 | −3.95 | 0.0000 |
| S2 | Aspheric | 2.8791 | 0.5746 | | | | −5.1626 |
| STO | Spherical | Infinite | −0.0383 | | | | |
| S3 | Aspheric | 3.5042 | 0.8531 | 1.55 | 56.1 | 1.73 | 20.7858 |
| S4 | Aspheric | −1.1812 | 0.0500 | | | | −1.2655 |
| S5 | Aspheric | 2.8449 | 0.2400 | 1.68 | 19.2 | −3.98 | −3.8590 |
| S6 | Aspheric | 1.3367 | 0.0845 | | | | −12.3578 |
| S7 | Aspheric | 2.7851 | 0.3478 | 1.55 | 56.1 | 12.48 | −66.5208 |
| S8 | Aspheric | 4.5037 | 0.0554 | | | | −55.0418 |
| S9 | Aspheric | 22.8859 | 0.3235 | 1.55 | 56.1 | 14.14 | 99.0000 |
| S10 | Aspheric | −11.5910 | 0.0500 | | | | 38.2195 |
| S11 | Aspheric | −7.0277 | 0.2500 | 1.55 | 56.1 | −5.44 | −81.0747 |
| S12 | Aspheric | 5.2030 | 0.0766 | | | | 13.6642 |
| S13 | Aspheric | 2.8307 | 0.4000 | 1.55 | 56.1 | 1.57 | −0.0207 |
| S14 | Aspheric | −1.1668 | 0.0500 | | | | −10.4635 |
| S15 | Aspheric | 1.0314 | 0.3500 | 1.68 | 19.2 | 1.57 | −4.3562 |
| S16 | Aspheric | 0.5415 | 0.4124 | | | | −2.5453 |
| S17 | Spherical | Infinite | 0.2100 | 1.52 | 64.2 | | |
| S18 | Spherical | Infinite | 0.1538 | | | | |
| S19 | Spherical | Infinite | | | | | |

In this example, a total effective focal length f of the optical imaging lens assembly is 1.68 mm, a total length TTL of the optical imaging lens assembly (i.e., a distance along the optical axis from the object-side surface S1 of the first lens E1 to the imaging plane S19 of the optical imaging lens assembly) is 4.73 mm, half of a diagonal length ImgH of an effective pixel area on the imaging plane S19 of the optical imaging lens assembly is 2.45 mm, and half of a maximal field-of-view Semi-FOV of the optical imaging lens assembly is 65.0°.

In example 1, the object-side surface and the image-side surface of any one of the first lens E1 to the eighth lens E8 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S16 in example 1.

It can be seen from FIG. 2A to FIG. 2D that the optical imaging lens assembly provided in example 1 may achieve good image quality.

Example 2

Figure 3:
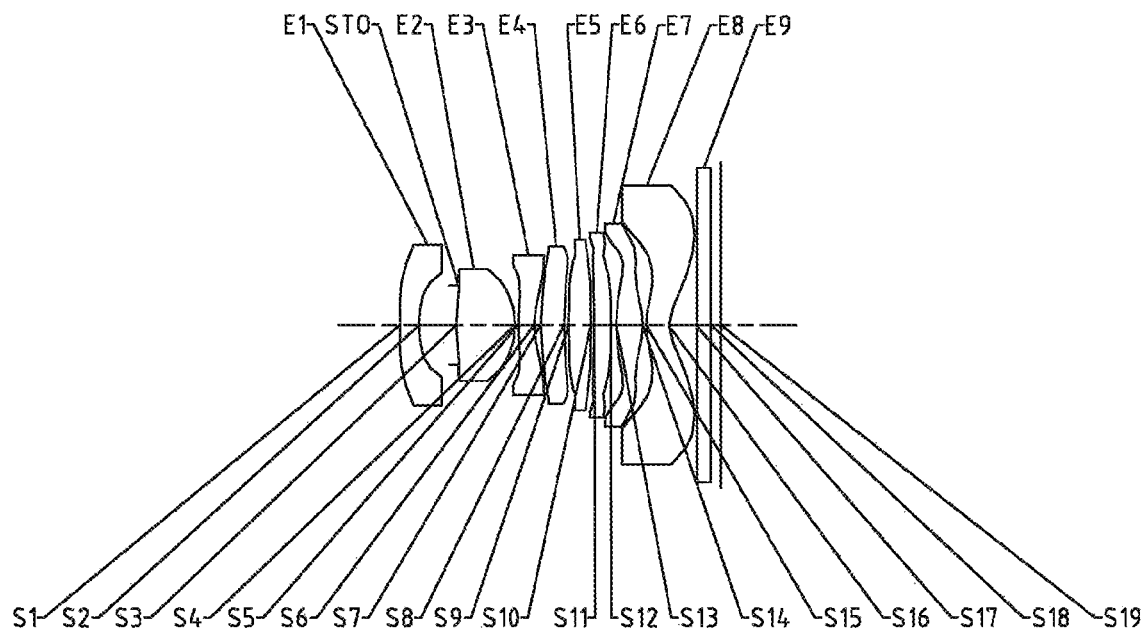
FIG. 3 illustrates a schematic structural view of an optical imaging lens assembly according to example 2 of the present disclosure.

An optical imaging lens assembly according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly includes a first lens E1, a stop STO, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-

TABLE 2

| Surface number | A4 | A6 | A8 | A10 | A12 | A14 | A16 | A18 | A20 |
|---|---|---|---|---|---|---|---|---|---|
| S1 | 3.2083E−01 | −4.7536E−02 | 3.8013E−03 | −1.3607E−03 | 6.2096E−04 | −4.9625E−05 | 2.2385E−05 | −1.1812E−05 | −2.2191E−06 |
| S2 | 1.8249E−01 | 2.0209E−03 | 1.0360E−03 | −2.3391E−04 | 8.1997E−06 | 2.7868E−05 | 9.4435E−06 | 7.8180E−06 | 2.5073E−07 |
| S3 | −8.5427E−03 | −1.2342E−03 | −1.5409E−04 | −6.6595E−06 | −7.8307E−06 | 2.7572E−06 | −3.2647E−06 | 2.0761E−06 | −5.2155E−07 |
| S4 | −6.9578E−02 | −5.8175E−03 | −2.0529E−03 | 2.4753E−04 | −2.6078E−04 | 3.8613E−05 | −2.4418E−05 | 7.6020E−06 | −5.5250E−06 |
| S5 | −1.5316E−01 | −3.9193E−04 | −2.4280E−03 | 1.3437E−03 | −1.6971E−04 | 6.4601E−05 | −4.4928E−05 | 1.1412E−05 | −8.2660E−06 |
| S6 | −5.3944E−02 | −6.7600E−03 | 3.4597E−03 | 2.1520E−04 | −1.6566E−04 | −8.8132E−05 | −5.4966E−06 | 6.7965E−06 | −1.4174E−05 |
| S7 | 1.8602E−02 | 1.8799E−03 | 5.1202E−03 | −2.4981E−03 | 2.2596E−04 | 2.2630E−04 | −1.1084E−04 | −2.5070E−05 | −7.5708E−06 |
| S8 | −5.3421E−02 | −1.6064E−02 | −4.4437E−03 | 7.0947E−06 | 1.0901E−03 | 8.5125E−04 | 2.3812E−04 | −5.5752E−05 | −2.5663E−05 |
| S9 | 7.7909E−02 | −2.7831E−03 | −5.1727E−03 | −2.0432E−04 | 1.5455E−05 | −9.1007E−04 | 1.6355E−04 | −1.1675E−04 | −7.1742E−06 |
| S10 | −2.8242E−02 | 2.0347E−02 | 1.8859E−02 | −1.6987E−03 | −1.0269E−03 | −2.2006E−03 | −2.1661E−03 | 3.8795E−04 | 4.7036E−04 |
| S11 | 4.0606E−02 | −8.9167E−03 | −1.1202E−02 | −6.2847E−03 | −4.3741E−03 | 2.4301E−03 | −1.1389E−03 | 1.0818E−03 | 4.6860E−04 |
| S12 | −4.6474E−01 | 1.2587E−01 | −5.6283E−02 | −2.2400E−02 | −9.2107E−05 | 2.8203E−03 | −1.0869E−03 | −8.4134E−04 | −3.5290E−04 |
| S13 | −5.4029E−01 | −5.6846E−02 | 6.2044E−02 | 5.3253E−03 | −6.7084E−03 | −5.1605E−04 | 1.1311E−03 | 8.1487E−04 |
| S14 | 1.5892E−01 | −1.4773E−01 | 3.5890E−02 | 2.4027E−02 | −4.5918E−03 | −1.0420E−03 | −1.8107E−03 | −1.3884E−03 | −9.4157E−04 |
| S15 | −1.0773E+00 | 1.6614E−01 | −9.5676E−03 | 2.0201E−02 | −7.3103E−03 | −6.6404E−03 | −7.8085E−04 | −1.4124E−03 | 1.3096E−04 |
| S16 | −1.4292E+00 | 2.4195E−01 | −1.1029E−01 | 5.8460E−02 | −1.5184E−02 | 1.0509E−02 | −5.5285E−03 | 3.7080E−04 | −1.0895E−03 |

Figure 2A:
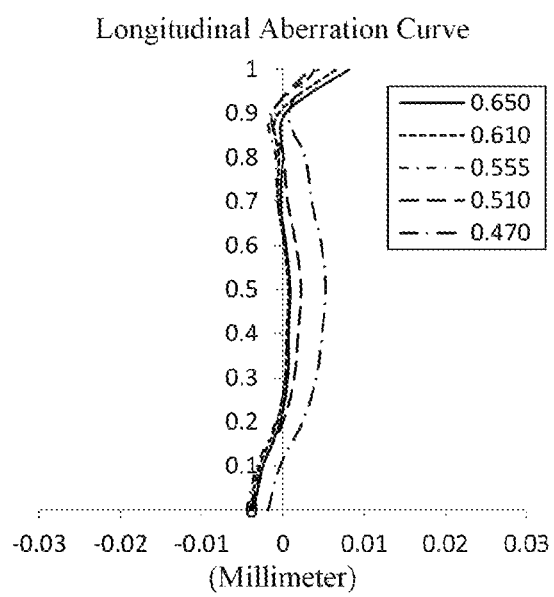
FIGS. 2A to 2D illustrate a longitudinal aberration curve, an astigmatic curve, a distortion curve, and a lateral color curve of the optical imaging lens assembly of the example 1, respectively.
Figure 2B:
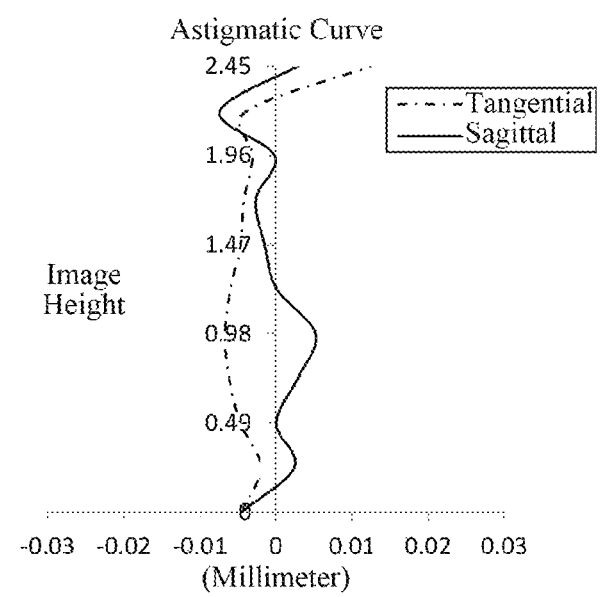
Figure 2C:
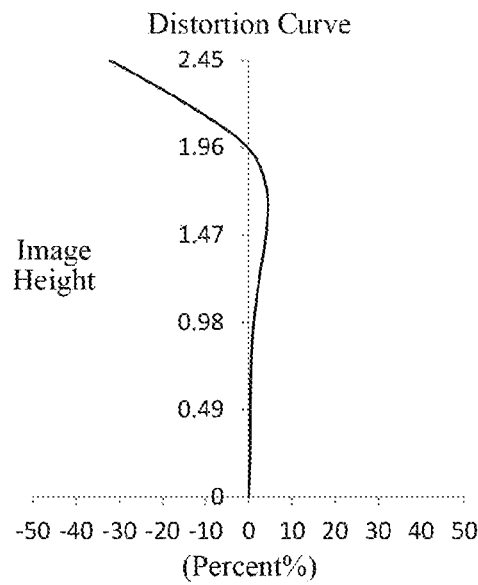
Figure 2D:
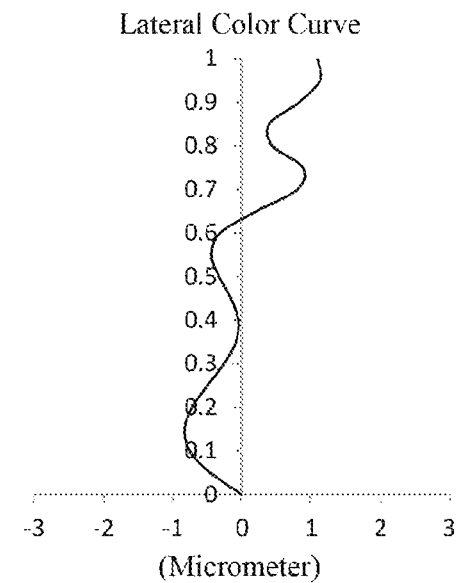

FIG. 2A illustrates a longitudinal aberration curve of the optical imaging lens assembly according to example 1, representing deviations of focal points converged by light of different wavelengths after passing through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different image heights. FIG. 2D illustrates a lateral color curve of the optical imaging lens assembly according to example 1, representing deviations of different image heights on an imaging plane after light passes through the lens assembly.

side surface S9 thereof is a concave surface, and an image-side surface S10 thereof is a convex surface. The sixth lens E6 has negative refractive power, an object-side surface S11 thereof is a concave surface, and an image-side surface S12 thereof is a concave surface. The seventh lens E7 has positive refractive power, an object-side surface S13 thereof is a convex surface, and an image-side surface S14 thereof is a convex surface. The eighth lens E8 has negative refractive power, an object-side surface S15 thereof is a convex surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 1.73 mm, a total length TTL of the optical imaging lens assembly is 4.86 mm, half of a diagonal length ImgH of an effective pixel area on the imaging plane S19 of the optical imaging lens assembly is 2.45 mm, and half of a maximal field-of-view Semi-FOV of the optical imaging lens assembly is 64.8°.

Table 3 is a table illustrating basic parameters of the optical imaging lens assembly of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

plane. FIG. 4C illustrates a distortion curve of the optical imaging lens assembly according to example 2, representing amounts of distortion corresponding to different image heights. FIG. 4D illustrates a lateral color curve of the optical imaging lens assembly according to example 2, representing deviations of different image heights on an imaging plane after light passes through the lens assembly. It can be seen from FIG. 4A to FIG. 4D that the optical imaging lens assembly provided in example 2 may achieve good image quality.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 700.0000 | | | | |
| S1 | Aspheric | −6.8898 | 0.2900 | 1.54 | 55.6 | −4.02 | 0.0000 |
| S2 | Aspheric | 3.1875 | 0.5981 | | | | −13.5260 |
| STO | Spherical | Infinite | −0.0350 | | | | |
| S3 | Aspheric | 3.4681 | 0.8921 | 1.55 | 56.1 | 1.69 | 21.2648 |
| S4 | Aspheric | −1.1449 | 0.0500 | | | | −1.6825 |
| S5 | Aspheric | 2.7776 | 0.2400 | 1.68 | 19.2 | −3.74 | −1.8287 |
| S6 | Aspheric | 1.2783 | 0.0956 | | | | −11.4371 |
| S7 | Aspheric | 3.1029 | 0.3560 | 1.55, | 56.1 | 10.02 | −67.7704 |
| S8 | Aspheric | 6.8788 | 0.0730 | | | | −11.2079 |
| S9 | Aspheric | −130.0000 | 0.3336 | 1.55 | 56.1 | 30.75 | −99.0000 |
| S10 | Aspheric | −14.8790 | 0.0500 | | | | 68.5048 |
| S11 | Aspheric | −8.4096 | 0.2500 | 1.55 | 56.1 | −5.90 | −99.0000 |
| S12 | Aspheric | 5.2768 | 0.0857 | | | | 13.3655 |
| S13 | Aspheric | 3.5912 | 0.4000 | 1.55 | 56.1 | 1.61 | 3.2044 |
| S14 | Aspheric | −1.1206 | 0.0500 | | | | −8.9820 |
| S15 | Aspheric | 1.0310 | 0.3500 | 1.68 | 19.2 | −2.42 | −4.0790 |
| S16 | Aspheric | 0.5459 | 0.4200 | | | | −2.5178 |
| S17 | Spherical | Infinite | 0.2100 | 1.52 | 64.2 | | |
| S18 | Spherical | Infinite | 0.1548 | | | | |
| S19 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | 3.1003E−01 | −4.7010E−02 | 5.1369E−03 | −1.2272E−03 | 5.6048E−04 | −8.7524E−05 | 2.2296E−05 | −1.2898E−05 | 2.0866E−06 |
| S2 | 1.7360E−01 | 1.4301E−04 | 1.1423E−03 | −8.5785E−05 | 4.5138E−05 | 2.4291E−05 | 7.5155E−06 | 5.3683E−06 | 5.0396E−07 |
| S3 | −8.3312E−03 | −1.1247E−03 | −1.2964E−04 | −3.5040E−06 | −6.3329E−06 | 2.9730E−06 | −3.1673E−06 | 1.4920E−06 | −2.5957E−07 |
| S4 | −6.0689E−02 | −6.6959E−03 | −9.8195E−04 | 4.3723E−05 | −1.2391E−04 | 6.0046E−06 | −9.3818E−06 | 4.5035E−06 | −2.4737E−06 |
| S5 | −1.4914E−01 | −1.6271E−03 | −1.5650E−03 | 9.5568E−04 | −5.4635E−05 | 2.3510E−05 | −2.8349E−05 | 8.0602E−06 | −3.5653E−06 |
| S6 | −7.0881E−02 | −5.1431E−03 | 6.0674E−03 | −5.5411E−04 | −4.9093E−04 | −1.7775E−04 | −1.3591E−05 | −2.9429E−05 | −3.0036E−05 |
| S7 | 1.7224E−02 | 3.6277E−03 | 3.7600E−03 | −2.9345E−03 | 1.1639E−04 | 4.1151E−04 | −1.3341E−04 | −3.4799E−05 | 2.8854E−06 |
| S8 | −3.8949E−02 | −1.7963E−02 | −6.9084E−03 | −1.9591E−03 | −4.4352E−04 | 3.1301E−04 | 3.6856E−04 | −8.1729E−05 | 5.5449E−05 |
| S9 | 1.1822E−01 | −1.2385E−03 | −3.7262E−03 | −9.8236E−04 | 1.2550E−03 | −9.6088E−04 | 3.0329E−04 | −1.4791E−04 | 2.2486E−05 |
| S10 | −2.7326E−02 | 1.0025E−02 | 1.6657E−02 | −4.0736E−03 | 5.5468E−04 | −5.9208E−04 | −3.1996E−03 | 3.2218E−04 | 5.3498E−04 |
| S11 | 5.6135E−02 | −1.3856E−02 | −6.0944E−03 | −6.3285E−03 | −3.9290E−03 | 4.1416E−03 | −2.6459E−03 | 7.2545E−04 | 3.6042E−04 |
| S12 | −4.5836E−01 | 1.3564E−01 | −4.4063E−02 | −2.1859E−02 | −1.6867E−03 | 3.6649E−03 | −7.8568E−04 | −4.3579E−04 | −4.8759E−04 |
| S13 | −5.0187E−01 | −8.0650E−02 | 6.4655E−02 | 8.5591E−03 | −3.8319E−03 | −9.1686E−03 | −1.3009E−03 | 1.6692E−03 | 8.8123E−04 |
| S14 | 2.2104E−01 | −1.6977E−01 | 3.0975E−02 | 2.9215E−02 | −4.3415E−03 | 1.5054E−03 | −4.6127E−04 | −8.9431E−04 | −8.8546E−04 |
| S15 | −1.0909E+00 | 1.6662E−01 | −1.1613E−02 | 1.9354E−02 | −4.4750E−03 | −3.3207E−03 | −4.5443E−04 | −1.7780E−03 | −1.5801E−04 |
| S16 | −1.4206E+00 | 2.4507E−01 | −1.0772E−01 | 5.4010E−02 | −1.6090E−02 | 1.0390E−02 | −4.8378E−03 | 8.0019E−04 | −9.4376E−04 |

Figure 4A:
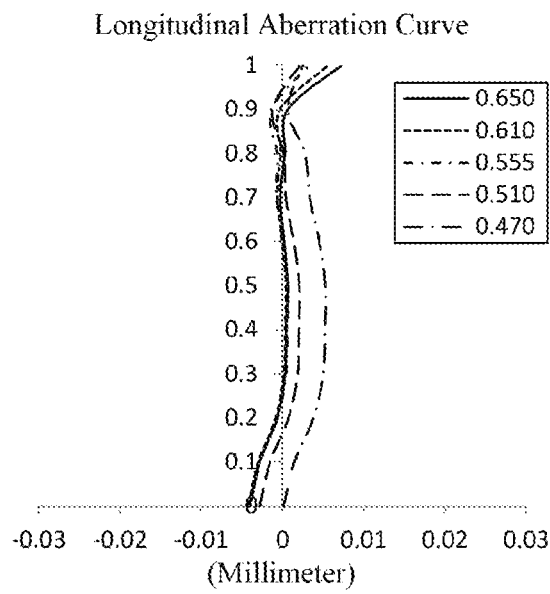
FIGS. 4A to 4D illustrate a longitudinal aberration curve, an astigmatic curve, a distortion curve, and a lateral color curve of the optical imaging lens assembly of the example 2, respectively.
Figure 4B:
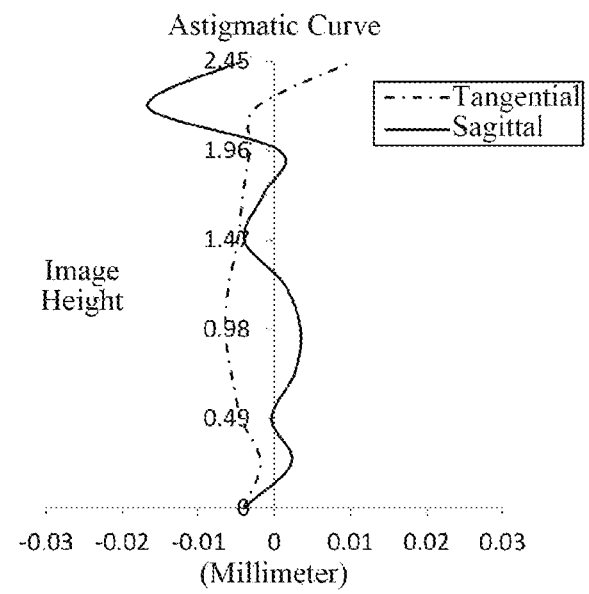
Figure 4C:
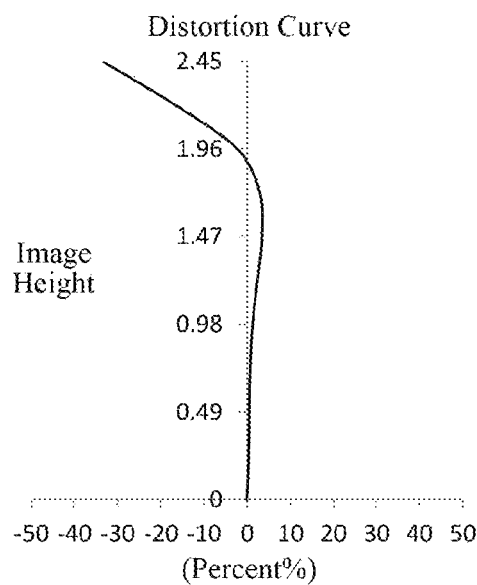
Figure 4D:
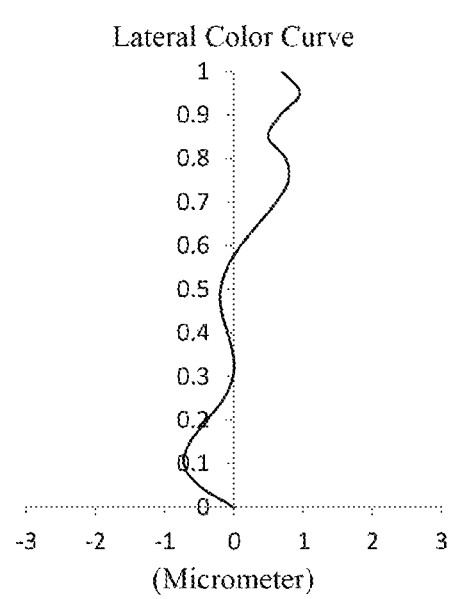

FIG. 4A illustrates a longitudinal aberration curve of the optical imaging lens assembly according to example 2, representing deviations of focal points converged by light of different wavelengths after passing through the lens assembly. FIG. 4B illustrates an astigmatic curve of the optical imaging lens assembly according to example 2, representing a curvature of a tangential plane and a curvature of a sagittal Example 3

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly includes a first lens E1, a stop STO, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a concave surface. The sixth lens E6 has negative refractive power, an object-side surface S11 thereof is a concave surface, and an image-side surface S12 thereof is a concave surface. The seventh lens E7 has positive refractive power, an object-side surface S13 thereof is a convex surface, and an image-side surface S14 thereof is a convex surface. The eighth lens E8 has negative refractive power, an object-side surface S15 thereof is a convex surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 1.76 mm, a total length TTL of the optical imaging lens assembly is 4.94 mm, half of a diagonal length ImgH of an effective pixel area on the imaging plane S19 of the optical imaging lens assembly is 2.45 mm, and half of a maximal field-of-view Semi-FOV of the optical imaging lens assembly is 64.4°.

Table 5 is a table illustrating basic parameters of the optical imaging lens assembly of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | 700.0000 | | | | |
| S1 | Aspheric | −6.6518 | 0.2900 | 1.54 | 55.6 | −3.82 | 0.0000 |
| S2 | Aspheric | 3.0093 | 0.5666 | | | | −14.2755 |
| STO | Spherical | Infinite | −0.0217 | | | | |
| S3 | Aspheric | 3.3920 | 0.9175 | 1.55 | 56.1 | 1.69 | 21.7164 |
| S4 | Aspheric | −1.1508 | 0.0500 | | | | −1.9216 |
| S5 | Aspheric | 2.6951 | 0.2400 | 1.68 | 19.2 | −3.75 | −0.6475 |
| S6 | Aspheric | 1.2610 | 0.1014 | | | | −11.0240 |
| S7 | Aspheric | 3.2626 | 0.3501 | 1.55 | 56.1 | 12.71 | −62.7324 |
| S8 | Aspheric | 5.9249 | 0.0671 | | | | −7.6898 |
| S9 | Aspheric | 9.7233 | 0.3572 | 1.55 | 56.1 | 22.64 | −99.0000 |
| S10 | Aspheric | 45.0000 | 0.0619 | | | | −99.0000 |
| S11 | Aspheric | −9.5380 | 0.2513 | 1.55 | 56.1 | −6.20 | −99.0000 |
| S12 | Aspheric | 5.2988 | 0.0913 | | | | 13.2306 |
| S13 | Aspheric | 3.9065 | 0.4094 | 1.55 | 56.1 | 1.60 | 3.6303 |
| S14 | Aspheric | −1.0828 | 0.0500 | | | | −8.3093 |
| S15 | Aspheric | 1.0525 | 0.3500 | 1.68 | 19.2 | −2.40 | −4.0921 |
| S16 | Aspheric | 0.5529 | 0.4324 | | | | −2.6523 |
| S17 | Spherical | Infinite | 0.2100 | 1.52 | 64.2 | | |
| S18 | Spherical | Infinite | 0.1671 | | | | |
| S19 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | 2.9924E−01 | −4.8064E−02 | 6.7339E−03 | −1.1216E−03 | 5.5262E−04 | −1.2762E−04 | 2.2493E−05 | −1.3504E−05 | 5.6973E−06 |
| S2 | 1.7311E−01 | 2.0259E−04 | 1.5871E−03 | 1.3709E−04 | 1.3091E−04 | 5.1884E−05 | 1.9695E−05 | 8.7409E−06 | 9.6729E−07 |
| S3 | −7.7827E−03 | −1.0991E−03 | −1.2106E−04 | −5.2730E−06 | −5.0054E−06 | 2.7117E−06 | −2.7416E−06 | 1.0214E−06 | −1.3994E−07 |
| S4 | −5.5719E−02 | −5.9759E−03 | −4.2643E−04 | −6.1636E−05 | −3.2226E−05 | −1.8784E−05 | 2.6218E−06 | 2.2206E−07 | −8.3600E−07 |
| S5 | −2.0770E−01 | −3.4977E−03 | −7.3899E−04 | 1.1117E−03 | −1.7248E−04 | −1.3458E−04 | −5.2321E−05 | −8.0752E−06 | −5.9811E−06 |
| S6 | −6.6715E−02 | −5.3002E−03 | 6.2621E−03 | −9.4058E−04 | −3.3034E−04 | −1.4799E−04 | 6.4758E−05 | −1.2752E−05 | −1.1773E−05 |
| S7 | 1.6034E−02 | 4.4727E−03 | 3.1704E−03 | −2.4216E−03 | −1.7063E−04 | 4.4875E−04 | −6.7412E−05 | −3.7611E−05 | 9.1268E−06 |
| S8 | −3.7906E−02 | −1.9815E−02 | −4.6004E−03 | −1.4174E−03 | −2.8765E−04 | 7.4611E−05 | 3.7979E−04 | −1.5546E−04 | 5.5663E−05 |
| S9 | 1.1043E−01 | 2.4413E−03 | −1.1133E−03 | −1.2038E−03 | 1.2616E−03 | −9.0740E−04 | 3.6677E−04 | −1.4024E−04 | 1.4034E−05 |
| S10 | −5.3759E−02 | 1.3823E−02 | 1.7108E−02 | −4.5020E−03 | 4.5066E−04 | 2.4705E−04 | −2.9939E−03 | 1.6641E−04 | 4.5568E−04 |
| S11 | 7.1164E−02 | −2.1489E−02 | −4.3385E−03 | −6.7510E−03 | −3.7304E−03 | 4.8248E−03 | −2.2342E−03 | 3.8271E−04 | 2.9668E−04 |
| S12 | −4.5302E−01 | 1.3905E−01 | −4.0325E−02 | −2.2690E−02 | −2.2021E−03 | 3.9173E−03 | −3.2463E−04 | −4.0444E−04 | −7.1279E−04 |
| S13 | −4.7025E−01 | −8.3027E−02 | 6.3463E−02 | 1.1832E−02 | −5.7035E−03 | −1.0605E−02 | −2.3321E−03 | 1.3099E−03 | 4.9475E−04 |

TABLE 6-continued

| Surface number | A4 | A6 | A8 | A10 | A12 | A14 | A16 | A18 | A20 |
|---|---|---|---|---|---|---|---|---|---|
| S14 | 2.4787E−01 | −1.8142E−01 | 2.7214E−02 | 3.1754E−02 | −4.2918E−03 | 2.7985E−03 | −1.4890E−04 | −7.1324E−04 | −8.9559E−04 |
| S15 | −1.0924E+00 | 1.5986E−01 | −6.3234E−03 | 1.5928E−02 | −4.2170E−03 | −2.4017E−03 | −1.1294E−03 | −1.9369E−03 | −2.7411E−04 |
| S16 | −1.3747E+00 | 2.2838E−01 | −9.1308E−02 | 4.7480E−02 | −1.4362E−02 | 8.3225E−03 | −4.5057E−03 | 6.6960E−04 | −9.3478E−04 |

Figure 6C:
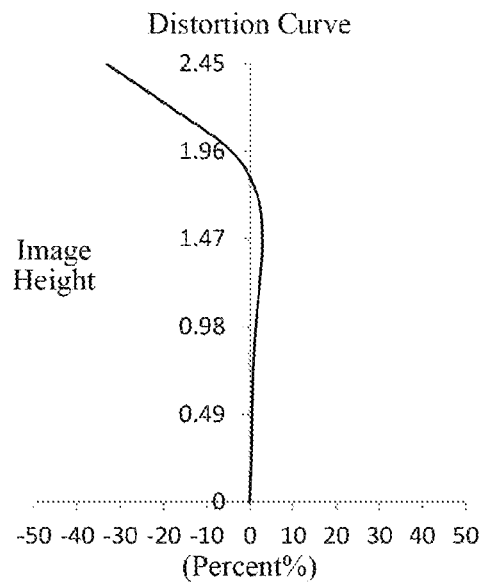
Figure 6D:
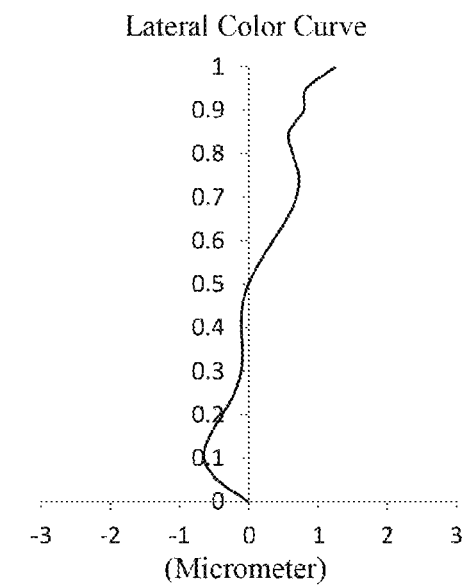

FIG. 6A illustrates a longitudinal aberration curve of the optical imaging lens assembly according to example 3, representing deviations of focal points converged by light of different wavelengths after passing through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different image heights. FIG. 6D illustrates a lateral color curve of the optical imaging lens assembly according to example 3, representing deviations of different image heights on an imaging plane after light passes through the lens assembly. It can be seen from FIG. 6A to FIG. 6D that the optical imaging lens assembly provided in example 3 may achieve a good image quality.

Example 4

Figure 7:
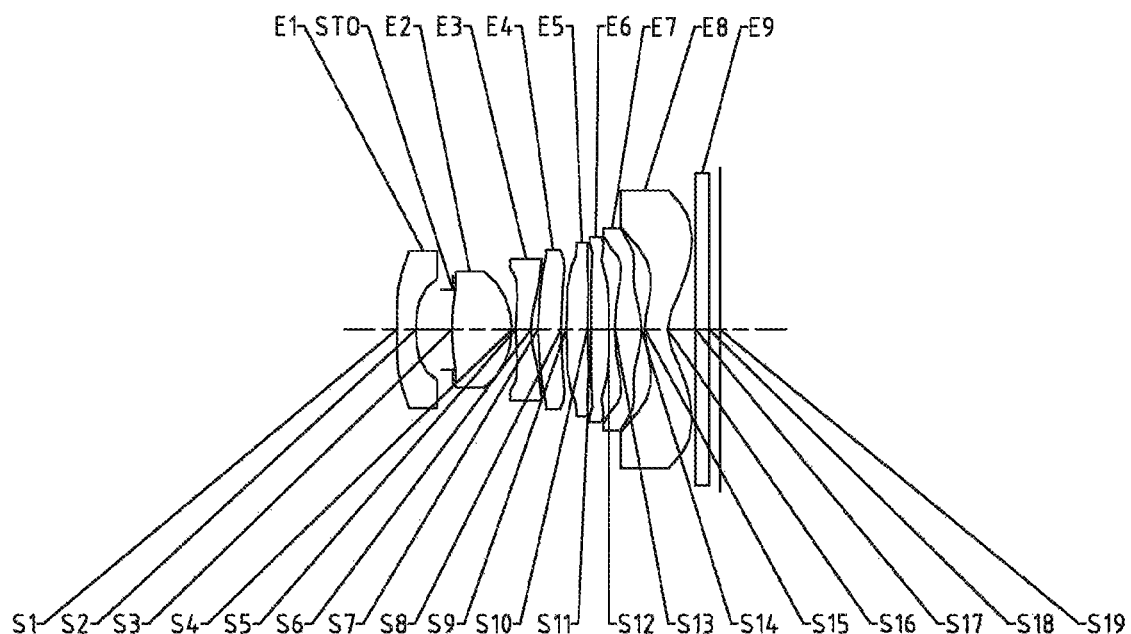
FIG. 7 illustrates a schematic structural view of an optical imaging lens assembly according to example 4 of the present disclosure.

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly includes a first lens E1, a stop STO, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has negative refractive power, an object-side surface S11 thereof is a concave surface, and an image-side surface S12 thereof is a concave surface. The seventh lens E7 has positive refractive power, an object-side surface S13 thereof is a convex surface, and an image-side surface S14 thereof is a convex surface. The eighth lens E8 has negative refractive power, an object-side surface S15 thereof is a convex surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 1.78 mm, a total length TTL of the optical imaging lens assembly is 4.96 mm, half of a diagonal length ImgH of an effective pixel area on the imaging plane S19 of the optical imaging lens assembly is 2.45 mm, and half of a maximal field-of-view Semi-FOV of the optical imaging lens assembly is 63.4°.

Table 7 is a table illustrating basic parameters of the optical imaging lens assembly of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | 700.0000 | | | | |
| S1 | Aspheric | −7.2174 | 0.2900 | 1.54 | 55.6 | −3.86 | 0.0000 |
| S2 | Aspheric | 2.9522 | 0.5629 | | | | −14.7024 |
| STO | Spherical | Infinite | −0.0123 | | | | |
| S3 | Aspheric | 3.3910 | 0.9255 | 1.55 | 56.1 | 1.70 | 21.7520 |
| S4 | Aspheric | −1.1527 | 0.0513 | | | | −1.9250 |
| S5 | Aspheric | 2.6145 | 0.2390 | 1.68 | 19.2 | −3.77 | −0.4971 |
| S6 | Aspheric | 1.2446 | 0.1048 | | | | −10.6645 |
| S7 | Aspheric | 3.2064 | 0.3570 | 1.55 | 56.1 | 9.88 | −64.9940 |
| S8 | Aspheric | 7.5921 | 0.0787 | | | | 0.6428 |
| S9 | Aspheric | 16.2688 | 0.3268 | 1.55 | 56.1 | −153.89 | −55.8378 |
| S10 | Aspheric | 13.5327 | 0.0592 | | | | −99.0000 |
| S11 | Aspheric | −18.5778 | 0.2681 | 1.55 | 56.1 | −7.53 | −73.5030 |
| S12 | Aspheric | 5.3021 | 0.0939 | | | | 13.2120 |
| S13 | Aspheric | 3.9234 | 0.4100 | 1.55 | 56.1 | 1.59 | 3.6688 |
| S14 | Aspheric | −1.0772 | 0.0506 | | | | −8.1642 |
| S15 | Aspheric | 1.0700 | 0.3500 | 1.68 | 19.2 | −2.32 | −4.1722 |
| S16 | Aspheric | 0.5523 | 0.4283 | | | | −2.7587 |

TABLE 7-continued

| Surface number | Surface type | Radius of curvature | Thickness/ Distance | Material Refractive index | Abbe number | Focal length | Conic coefficient |
|---|---|---|---|---|---|---|---|
| S17 | Spherical | Infinite | 0.2100 | 1.52 | 64.2 | | |
| S18 | Spherical | Infinite | 0.1631 | | | | |
| S19 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | 3.0010E−01 | −4.6955E−02 | 6.6483E−03 | −1.0517E−03 | 5.3410E−04 | −1.2339E−04 | 2.0080E−05 | −1.1797E−05 | 7.2296E−06 |
| S2 | 1.7340E−01 | 7.8667E−04 | 1.7287E−03 | 1.9032E−04 | 1.4362E−04 | 5.5096E−05 | 2.2059E−05 | 8.8282E−06 | 1.8188E−06 |
| S3 | −7.7782E−03 | −1.0873E−03 | −1.1817E−04 | −6.1274E−06 | −4.5384E−06 | 2.5607E−06 | −2.6652E−06 | 9.8892E−07 | −1.3418E−07 |
| S4 | −5.5462E−02 | −5.6334E−03 | −3.5834E−04 | −7.6581E−05 | −1.9725E−05 | −1.7922E−05 | 1.6082E−06 | 1.6550E−06 | −1.1431E−06 |
| S5 | −2.0699E−01 | −3.5462E−03 | −6.1089E−04 | 1.0940E−03 | −7.8782E−05 | −1.0623E−04 | −4.7599E−05 | −5.2836E−06 | −7.0526E−06 |
| S6 | −6.5264E−02 | −5.4796E−03 | 6.4386E−03 | −1.0367E−03 | −2.9020E−04 | −9.5768E−05 | 5.9118E−05 | −1.4258E−05 | −1.7703E−05 |
| S7 | 1.4151E−02 | 4.5896E−03 | 3.1295E−03 | −2.5718E−03 | −2.1362E−04 | 5.2560E−04 | −6.5156E−05 | −5.4099E−05 | 1.1849E−05 |
| S8 | −3.4300E−02 | −2.0470E−02 | −4.5797E−03 | −1.2218E−03 | −3.5885E−04 | 9.3406E−05 | 3.5114E−04 | −1.5781E−04 | 6.1132E−05 |
| S9 | 1.1198E−01 | 2.6283E−03 | −1.2757E−03 | −1.2882E−03 | 1.3398E−03 | −9.1219E−04 | 3.6696E−04 | −1.3580E−04 | 1.3691E−05 |
| S10 | −6.6760E−02 | 1.2540E−02 | 1.6979E−02 | −4.6513E−03 | 3.8793E−04 | 3.3628E−04 | −2.9269E−03 | 1.5796E−04 | 4.4265E−04 |
| S11 | 6.9939E−02 | −2.2158E−02 | −4.3634E−03 | −6.7814E−03 | −3.9132E−03 | 4.7701E−03 | −2.1656E−03 | 3.6982E−04 | 2.9450E−04 |
| S12 | −4.4846E−01 | 1.3813E−01 | −4.0299E−02 | −2.2247E−02 | −1.9687E−03 | 3.6808E−03 | −3.4583E−04 | −3.8368E−04 | −6.8607E−04 |
| S13 | −4.6790E−01 | −8.4157E−02 | 6.3010E−02 | 1.1763E−02 | −5.7276E−03 | −1.0600E−02 | −2.4712E−03 | 1.3041E−03 | 5.3108E−04 |
| S14 | 2.5335E−01 | −1.8209E−01 | 2.6247E−02 | 3.1617E−02 | −4.1527E−03 | 3.0961E−03 | 7.3693E−05 | −6.5887E−04 | −8.7921E−04 |
| S15 | −1.0875E+00 | 1.6379E−01 | −1.1203E−02 | 1.6478E−02 | −4.5490E−03 | −1.8801E−03 | −1.0488E−03 | −1.9959E−03 | −3.8717E−04 |
| S16 | −1.3297E+00 | 2.1944E−01 | −8.8817E−02 | 4.5333E−02 | −1.4292E−02 | 8.1744E−03 | −4.1950E−03 | 6.5717E−04 | −8.1366E−04 |

Figure 8A:
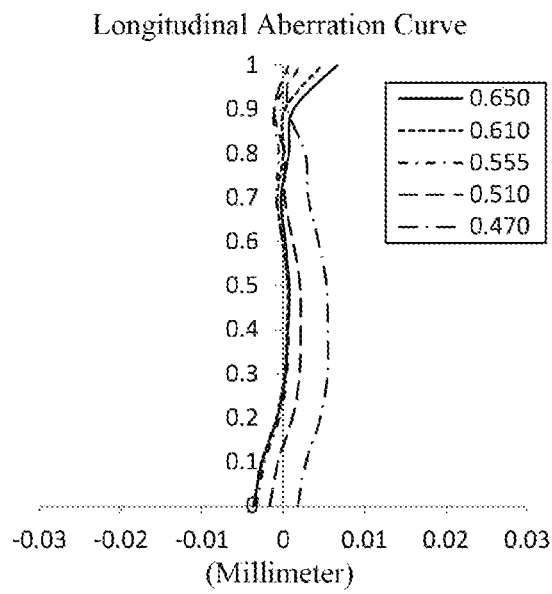
FIGS. 8A to 8D illustrate a longitudinal aberration curve, an astigmatic curve, a distortion curve, and a lateral color curve of the optical imaging lens assembly of the example 4, respectively.
Figure 8B:
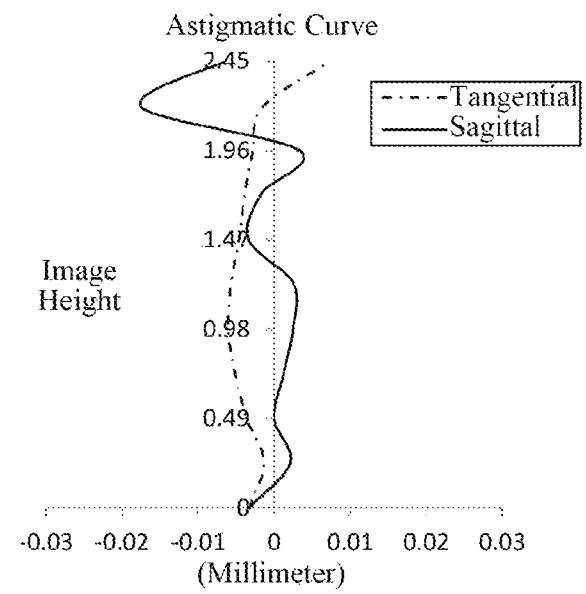
Figure 8C:
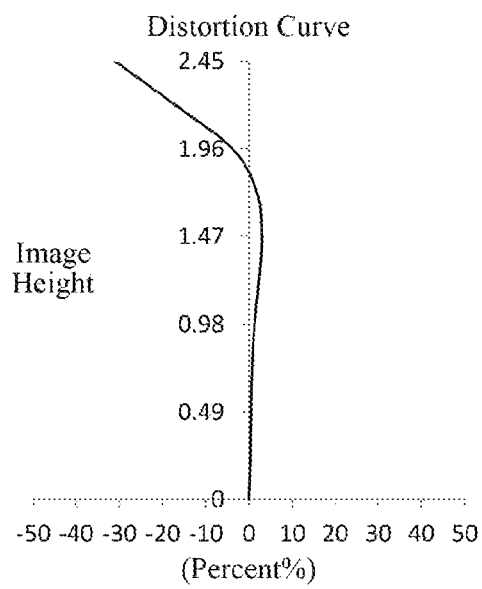
Figure 8D:
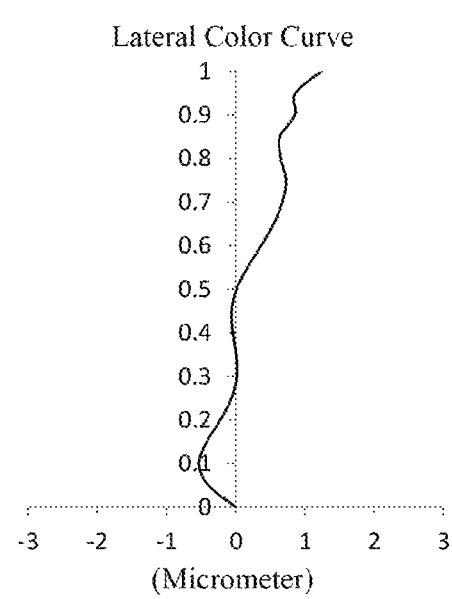

FIG. 8A illustrates a longitudinal aberration curve of the optical imaging lens assembly according to example 4, representing deviations of focal points converged by light of different wavelengths after passing through the lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion corresponding to different image heights. FIG. 8D illustrates a lateral color curve of the optical imaging lens assembly according to example 4, representing deviations of different image heights on an imaging plane after light passes through the lens assembly. It can be seen from FIG. 8A to FIG. 8D that the optical imaging lens assembly provided in example 4 may achieve good image quality.

Example 5

Figure 9:
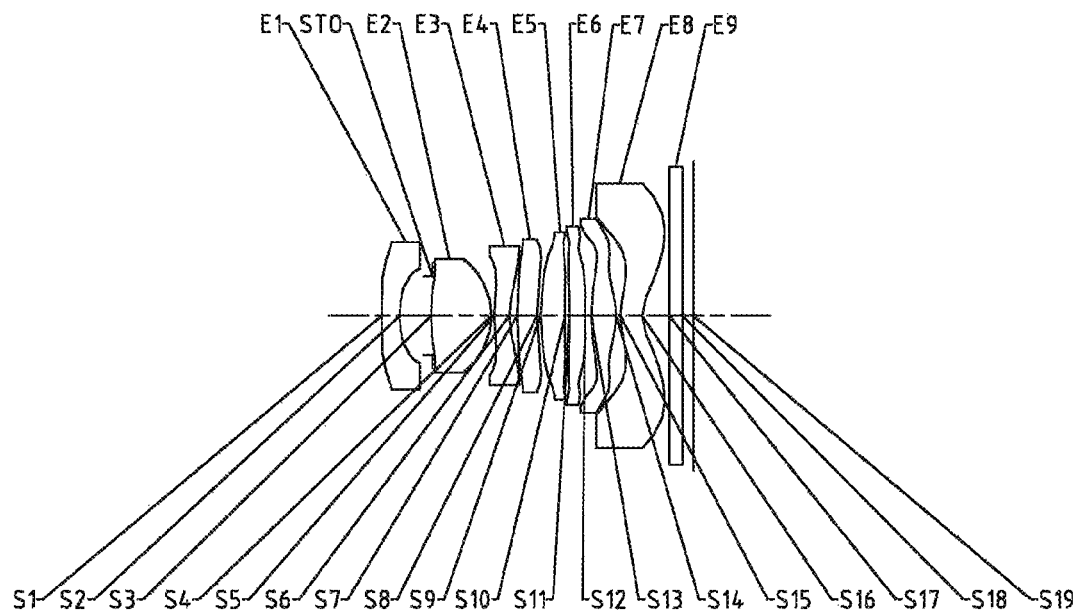
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly includes a first lens E1, a stop STO, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a concave surface. The sixth lens E6 has negative refractive power, an object-side surface S11 thereof is a concave surface, and an image-side surface S12 thereof is a concave surface. The seventh lens E7 has positive refractive power, an object-side surface S13 thereof is a convex surface, and an image-side surface S14 thereof is a convex surface. The eighth lens E8 has negative refractive power, an object-side surface S15 thereof is a convex surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 1.83 mm, a total length TTL of the optical imaging lens assembly is 5.02 mm, half of a diagonal length ImgH of an effective pixel area on the imaging plane S19 of the optical imaging lens assembly is 2.45 mm, and half of a maximal field-of-view Semi-FOV of the optical imaging lens assembly is 62.9°.

Table 9 is a table illustrating basic parameters of the optical imaging lens assembly of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 700.0000 | | | | |
| S1 | Aspheric | −7.6922 | 0.2900 | 1.54 | 55.6 | −3.70 | 0.0000 |
| S2 | Aspheric | 2.7163 | 0.5242 | | | | −13.5396 |
| STO | Spherical | Infinite | −0.0199 | | | | |
| S3 | Aspheric | 3.3739 | 0.9704 | 1.55 | 56.1 | 1.67 | 22.3518 |
| S4 | Aspheric | −1.1185 | 0.0500 | | | | −2.0541 |
| S5 | Aspheric | 2.6466 | 0.2413 | 1.68 | 19.2 | −4.61 | 0.4253 |
| S6 | Aspheric | 1.3801 | 0.1305 | | | | −10.3110 |
| S7 | Aspheric | 10.0000 | 0.3180 | 1.55 | 56.1 | −13.70 | −13.5781 |
| S8 | Aspheric | 4.2312 | 0.0527 | | | | −39.6111 |
| S9 | Aspheric | 3.1062 | 0.3942 | 1.55 | 56.1 | 6.35 | −61.1155 |
| S10 | Aspheric | 28.5409 | 0.0725 | | | | 82.4016 |
| S11 | Aspheric | −7.1352 | 0.2509 | 1.55 | 56.1 | −5.56 | −99.0000 |
| S12 | Aspheric | 5.3456 | 0.1016 | | | | 13.1296 |
| S13 | Aspheric | 4.1385 | 0.4012 | 1.55 | 56.1 | 1.64 | 5.1365 |
| S14 | Aspheric | −1.1046 | 0.0690 | | | | −7.6097 |
| S15 | Aspheric | 1.1293 | 0.3500 | 1.68 | 19.2 | −2.37 | −4.3617 |
| S16 | Aspheric | 0.5799 | 0.4383 | | | | −3.0371 |
| S17 | Spherical | Infinite | 0.2100 | 1.52 | 64.2 | | |
| S18 | Spherical | Infinite | 0.1730 | | | | |
| S19 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | 2.8864E−01 | −4.8479E−02 | 7.8157E−03 | −1.0612E−03 | 5.1800E−04 | −1.3302E−04 | 2.8216E−05 | −6.9500E−06 | 7.7164E−06 |
| S2 | 1.7509E−01 | 1.5639E−03 | 2.2406E−03 | 4.1676E−04 | 2.3005E−04 | 9.0767E−05 | 3.5959E−05 | 1.4022E−05 | 3.1879E−06 |
| S3 | −2.2873E−02 | −5.3361E−03 | −1.1308E−03 | −3.0799E−04 | −1.1191E−04 | −3.5241E−05 | −1.7162E−05 | −4.0024E−06 | −4.1689E−06 |
| S4 | −5.2172E−02 | −4.3802E−03 | −2.0383E−04 | −3.5907E−05 | 1.1066E−06 | −1.8705E−05 | 2.5467E−06 | 7.5736E−07 | −3.0675E−07 |
| S5 | −2.1036E−01 | −3.8842E−03 | −4.1464E−04 | 7.1700E−04 | 5.0967E−05 | −8.7059E−05 | −6.9594E−06 | 1.9363E−06 | −2.3597E−06 |
| S6 | −6.3209E−02 | −5.8651E−03 | 6.5235E−03 | −1.2450E−03 | −1.0731E−04 | −2.1643E−04 | 6.9438E−05 | −2.3730E−06 | −8.5095E−06 |
| S7 | 1.7250E−02 | 2.1685E−03 | 4.1361E−03 | −2.2916E−03 | −2.4535E−04 | 3.7448E−04 | −5.1980E−05 | −2.9839E−05 | −1.7136E−06 |
| S8 | −5.6839E−02 | −1.5626E−02 | −4.8874E−03 | −6.1740E−04 | 1.4885E−04 | −6.9748E−05 | 3.9881E−04 | −1.4069E−04 | 3.5551E−05 |
| S9 | 8.6952E−02 | 6.6123E−03 | 8.1288E−06 | −2.0266E−03 | 1.6180E−03 | −9.9111E−04 | 3.8590E−04 | −1.2440E−04 | 1.2373E−05 |
| S10 | −6.5254E−02 | 1.7679E−02 | 1.8145E−02 | −4.6699E−03 | −3.6014E−04 | 1.2968E−03 | −2.3049E−03 | 1.4854E−04 | 2.7899E−04 |
| S11 | 8.6140E−02 | −2.8414E−02 | −1.5264E−03 | −5.9004E−03 | −4.2910E−03 | 5.0001E−03 | −1.6585E−03 | 3.0289E−04 | 1.8291E−04 |
| S12 | −4.4136E−01 | 1.3071E−01 | −3.5631E−02 | −1.9411E−02 | −3.1586E−03 | 3.0734E−03 | −5.7162E−05 | −8.7191E−05 | −4.6197E−04 |
| S13 | −4.7591E−01 | −9.2964E−02 | 5.7942E−02 | 1.5242E−02 | −4.3969E−03 | −7.9088E−03 | −6.0705E−04 | 1.8059E−03 | 6.6260E−04 |
| S14 | 2.7316E−01 | −1.9071E−01 | 2.9243E−02 | 2.9848E−02 | −5.6136E−03 | 2.9354E−03 | 5.3088E−04 | −3.3244E−04 | −6.9536E−04 |
| S15 | −1.0825E+00 | 1.6369E−01 | −6.2083E−03 | 1.3487E−02 | −4.7027E−03 | −9.5594E−04 | −1.2343E−03 | −1.3533E−03 | −4.6836E−04 |
| S16 | −1.2511E+00 | 1.9085E−01 | −6.8795E−02 | 3.5193E−02 | −1.0193E−02 | 5.6781E−03 | −3.0552E−03 | 1.0798E−04 | −7.5486E−04 |

Figures 10A, 10B:
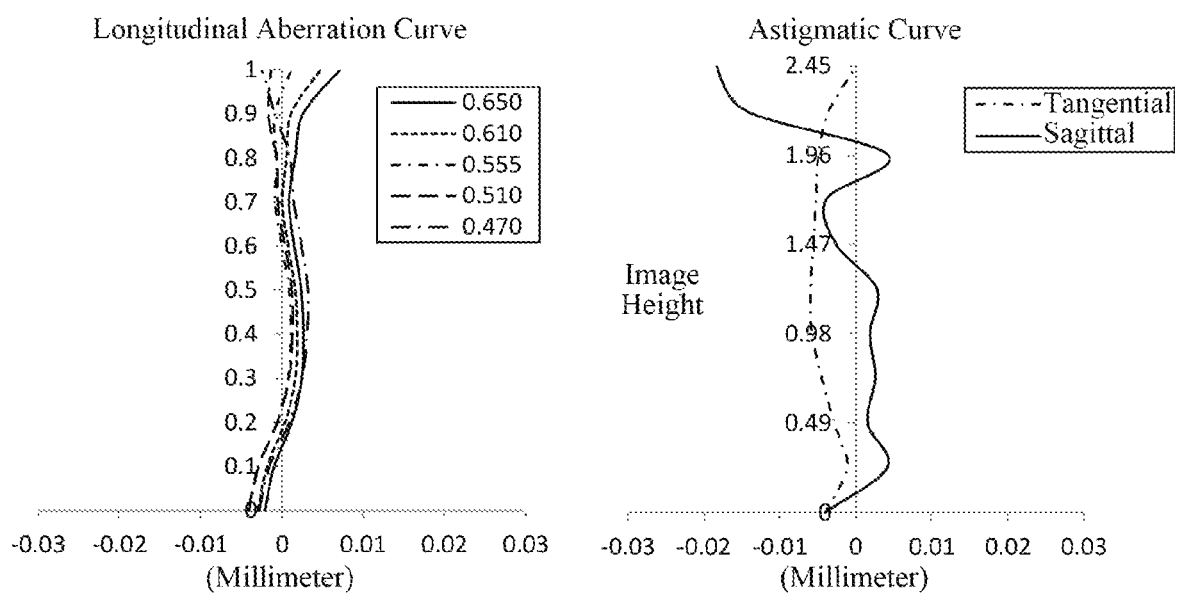
FIGS. 10A to 10D illustrate a longitudinal aberration curve, an astigmatic curve, a distortion curve, and a lateral color curve of the optical imaging lens assembly of the example 5, respectively.
Figure 10C:
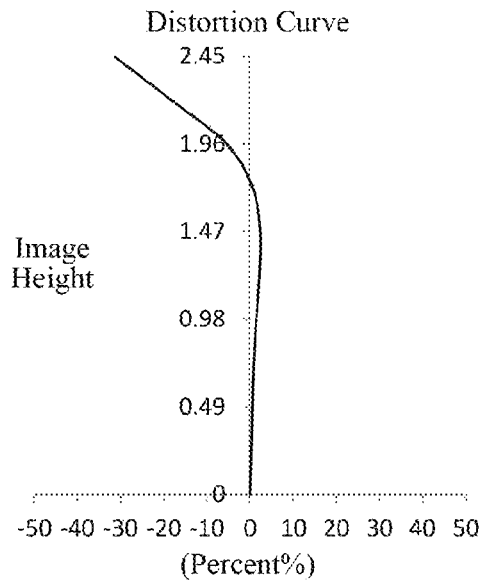
Figure 10D:
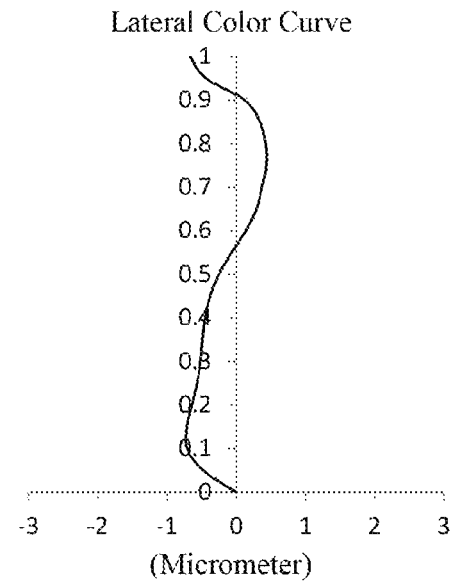

FIG. 10A illustrates a longitudinal aberration curve of the optical imaging lens assembly according to example 5, representing deviations of focal points converged by light of different wavelengths after passing through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different image heights. FIG. 10D illustrates a lateral color curve of the optical imaging lens assembly according to example 5, representing deviations of different image heights on an imaging plane after light passes through the lens assembly. It can be seen from FIG. 10A to FIG. 10D that the optical imaging lens assembly provided in example 5 may achieve good image quality.

Example 6

Figure 11:
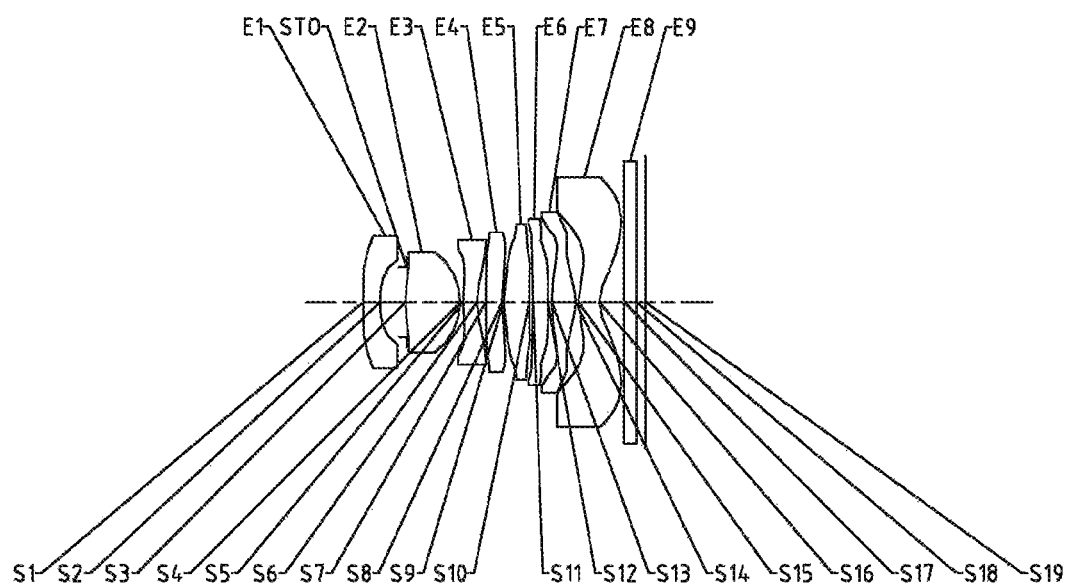
FIG. 11 illustrates a schematic structural view of an optical imaging lens assembly according to example 6 of the present disclosure.

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly includes a first lens E1, a stop STO, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a concave surface. The sixth lens E6 has negative refractive power, an object-side surface S11 thereof is a concave surface, and an image-side surface S12 thereof is a concave surface. The seventh lens E7 has positive refractive power, an object-side surface S13 thereof is a convex surface, and an image-side surface S14 thereof is a convex surface. The eighth lens E8 has negative refractive power, an object-side surface S15 thereof is a convex surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 1.74 mm, a total length TTL of the optical imaging lens assembly is 4.79 mm, half of a diagonal length ImgH of an effective pixel area on the imaging plane S19 of the optical imaging lens assembly is 2.45 mm, and half of a maximal field-of-view Semi-FOV of the optical imaging lens assembly is 62.6°.

Table 11 is a table illustrating basic parameters of the optical imaging lens assembly of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | 700.0000 | | | | |
| S1 | Aspheric | −8.1356 | 0.2900 | 1.54 | 55.6 | −3.67 | 0.0000 |
| S2 | Aspheric | 2.6358 | 0.4497 | | | | −7.9857 |
| STO | Spherical | Infinite | −0.0172 | | | | |
| S3 | Aspheric | 3.3872 | 0.9225 | 1.55 | 56.1 | 1.54 | 21.8600 |
| S4 | Aspheric | −1.0103 | 0.0500 | | | | −1.8496 |
| S5 | Aspheric | 2.7911 | 0.2390 | 1.68 | 19.2 | −4.17 | −2.4659 |
| S6 | Aspheric | 1.3552 | 0.1473 | | | | −10.7744 |
| S7 | Aspheric | −65.0000 | 0.2753 | 1.55 | 56.1 | −4.38 | −99.0000 |
| S8 | Aspheric | 2.4848 | 0.0241 | | | | −99.0000 |
| S9 | Aspheric | 1.9087 | 0.4373 | 1.55 | 56.1 | 3.54 | −47.2266 |
| S10 | Aspheric | 150.0000 | 0.0652 | | | | −99.0000 |
| S11 | Aspheric | −6.0090 | 0.2500 | 1.55 | 56.1 | −5.15 | −52.2548 |
| S12 | Aspheric | 5.3511 | 0.0697 | | | | 13.6072 |
| S13 | Aspheric | 4.2398 | 0.4000 | 1.55 | 56.1 | 1.45 | 5.4909 |
| S14 | Aspheric | −0.9437 | 0.0500 | | | | −6.2774 |
| S15 | Aspheric | 1.0875 | 0.3500 | 1.68 | 19.2 | −2.10 | −4.1930 |
| S16 | Aspheric | 0.5363 | 0.4214 | | | | −3.1371 |
| S17 | Spherical | Infinite | 0.2100 | 1.52 | 64.2 | | |
| S18 | Spherical | Infinite | 0.1562 | | | | |
| S19 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | 3.0100E−01 | −4.9185E−02 | 8.5712E−03 | −5.9364E−04 | 7.3874E−04 | −7.3175E−05 | 8.8845E−05 | 2.4712E−05 | 2.5181E−05 |
| S2 | 1.8401E−01 | 5.8624E−03 | 3.9739E−03 | 1.3530E−03 | 7.5515E−04 | 3.3411E−04 | 1.3952E−04 | 4.3579E−05 | 1.0057E−05 |
| S3 | −2.4141E−02 | −6.3614E−03 | −1.4693E−03 | −5.4015E−04 | −2.9390E−04 | −1.6226E−04 | −9.2832E−05 | −4.1586E−05 | −1.6234E−05 |
| S4 | −5.8750E−02 | −7.3512E−03 | −2.9018E−04 | −2.4042E−04 | 4.2098E−05 | −6.2853E−05 | 2.2269E−05 | −7.1026E−06 | −1.1026E−07 |
| S5 | −2.3920E−01 | −5.7560E−03 | 2.5890E−04 | 1.2098E−04 | −3.7019E−04 | −5.7110E−04 | −9.1451E−05 | −7.5200E−05 | 1.4060E−06 |
| S6 | −7.5985E−02 | −2.9819E−03 | 8.1228E−03 | −3.4751E−03 | −3.9352E−04 | −6.5896E−04 | 1.8547E−04 | −5.1494E−05 | 2.2027E−05 |
| S7 | 5.0776E−02 | −8.0265E−04 | 6.0891E−03 | −2.4630E−03 | 8.5828E−05 | 9.9867E−05 | −2.8280E−05 | 6.7744E−06 | −6.1208E−06 |
| S8 | −5.8564E−02 | −1.3275E−02 | −3.5916E−03 | −1.8415E−03 | 2.2095E−03 | 3.6851E−05 | 5.1425E−04 | −1.0936E−04 | 5.8445E−05 |
| S9 | 6.6925E−02 | 1.0533E−02 | −4.7301E−04 | −3.3901E−03 | 1.9440E−03 | −1.1998E−03 | 3.5419E−04 | −1.3548E−04 | 9.4366E−06 |
| S10 | −8.4651E−02 | 1.1831E−02 | 1.9812E−02 | −7.4105E−03 | −1.5470E−03 | 1.2233E−03 | −2.2642E−03 | 3.6082E−04 | 3.6504E−04 |
| S11 | 7.2480E−02 | −3.4409E−02 | −1.4079E−03 | −5.9591E−03 | −4.1354E−03 | 5.3200E−03 | −1.6603E−03 | 4.1090E−04 | 2.0862E−04 |
| S12 | −4.7909E−01 | 1.3019E−01 | −3.7205E−02 | −2.2712E−02 | −2.8835E−03 | 3.3017E−03 | −3.5612E−04 | 6.2482E−05 | −5.0244E−04 |
| S13 | −4.8159E−01 | −8.0915E−02 | 5.7539E−02 | 1.5927E−02 | −2.1012E−03 | −8.2468E−03 | 9.1274E−05 | 2.4911E−03 | 8.5491E−04 |
| S14 | 3.0677E−01 | −1.7237E−01 | 2.4380E−02 | 3.9855E−02 | −4.3273E−03 | 1.4775E−03 | 4.0244E−04 | −1.5114E−03 | −1.2026E−03 |
| S15 | −1.0822E+00 | 1.7137E−01 | −1.2079E−02 | 1.7342E−02 | −5.6275E−03 | −1.6293E−03 | −1.3434E−03 | −1.7151E−03 | −5.0781E−04 |
| S16 | −1.2225E+00 | 1.8221E−01 | −7.1538E−02 | 3.9587E−02 | −1.0864E−02 | 5.7369E−03 | −3.7041E−03 | 1.4169E−04 | −6.8343E−04 |

Figure 12A:
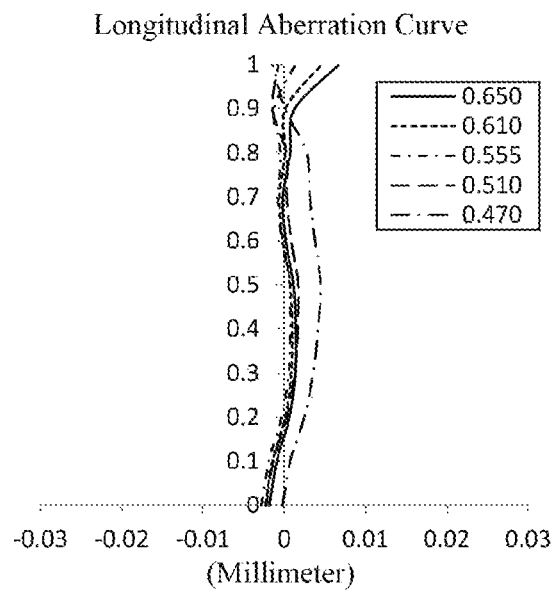
FIGS. 12A to 12D illustrate a longitudinal aberration curve, an astigmatic curve, a distortion curve, and a lateral color curve of the optical imaging lens assembly of the example 6, respectively.
Figure 12B:
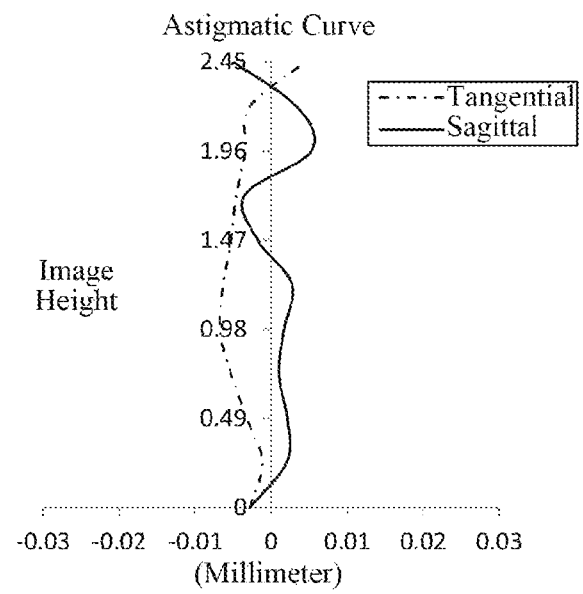
Figure 12C:
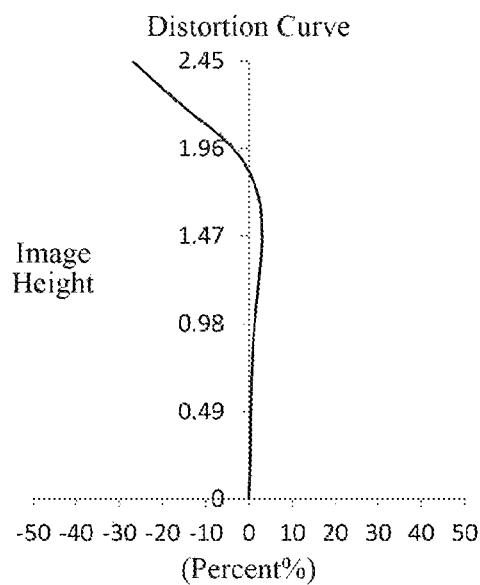
Figure 12D:
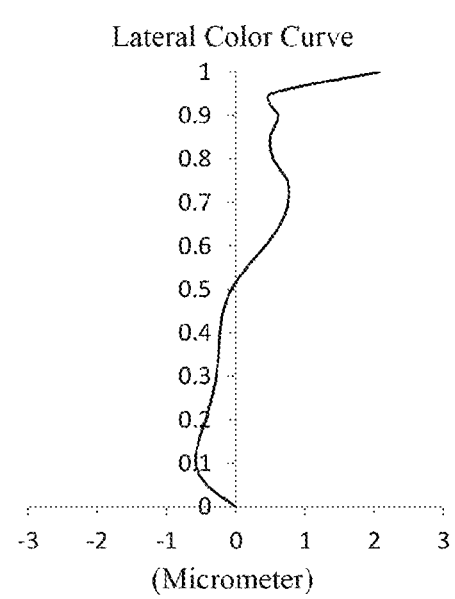

FIG. 12A illustrates a longitudinal aberration curve of the optical imaging lens assembly according to example 6, representing deviations of focal points converged by light of different wavelengths after passing through the lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion corresponding to different image heights. FIG. 12D illustrates a lateral color curve of the optical imaging lens assembly according to example 6, representing deviations of different image heights on an imaging plane after light passes through the lens assembly. It can be seen from FIG. 12A to FIG. 12D that the optical imaging lens assembly provided in example 6 may achieve good image quality.

Example 7

Figure 13:
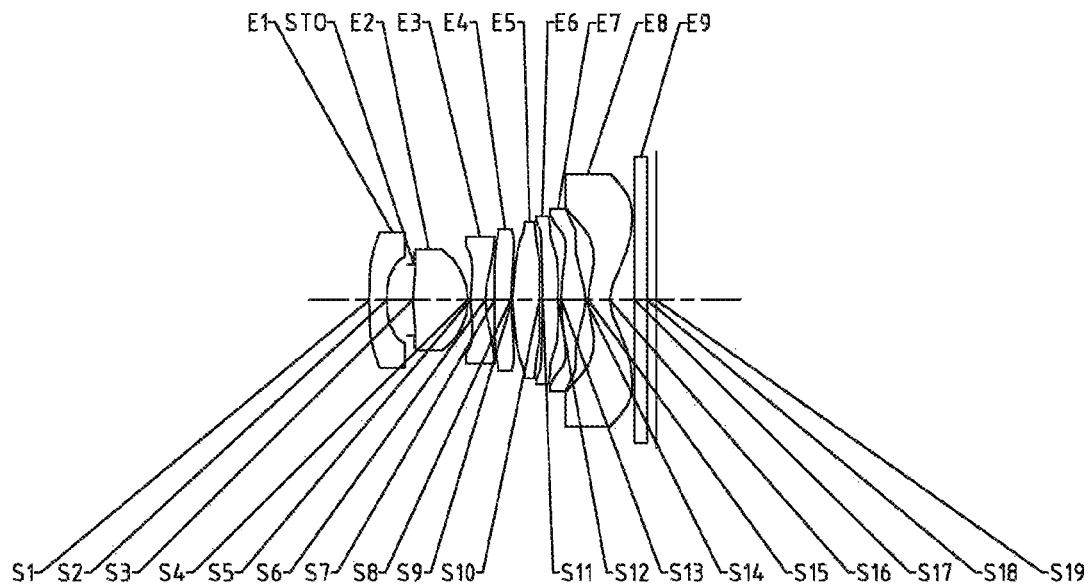
FIG. 13 illustrates a schematic structural view of an optical imaging lens assembly according to example 7 of the present disclosure.

An optical imaging lens assembly according to example 7 of the present disclosure is described below with reference to FIG. 13 to FIG. 14D. FIG. 13 shows a schematic structural view of the optical imaging lens assembly according to example 7 of the present disclosure.

As shown in FIG. 13, the optical imaging lens assembly includes a first lens E1, a stop STO, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a concave surface, and an image-side surface S12 thereof is a concave surface. The seventh lens E7 has positive refractive power, an object-side surface S13 thereof is a convex surface, and an image-side surface S14 thereof is a convex surface. The eighth lens E8 has negative refractive power, an object-side surface S15 thereof is a convex surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 1.73 mm, a total length TTL of the optical imaging lens assembly is 4.76 mm, half of a diagonal length ImgH of an effective pixel area on the imaging plane S19 of the optical imaging lens assembly is 2.45 mm, and half of a maximal field-of-view Semi-FOV of the optical imaging lens assembly is 62.9°.

Table 13 is a table illustrating basic parameters of the optical imaging lens assembly of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 700.0000 | | | | |
| S1 | Aspheric | −8.1155 | 0.2900 | 1.54 | 55.6 | −3.81 | 0.0000 |
| S2 | Aspheric | 2.7645 | 0.4519 | | | | −8.9910 |
| STO | Spherical | Infinite | −0.0223 | | | | |
| S3 | Aspheric | 3.4524 | 0.9150 | 1.55 | 56.1 | 1.54 | 21.9134 |
| S4 | Aspheric | −1.0051 | 0.0500 | | | | −1.8865 |
| S5 | Aspheric | 2.7171 | 0.2390 | 1.68 | 19.2 | −3.97 | −2.3844 |
| S6 | Aspheric | 1.3030 | 0.1507 | | | | −10.6037 |
| S7 | Aspheric | −65.0000 | 0.2776 | 1.55 | 56.1 | −6.18 | −22.7540 |
| S8 | Aspheric | 3.5636 | 0.0200 | | | | −99.0000 |
| S9 | Aspheric | 2.4773 | 0.4500 | 1.55 | 56.1 | 4.25 | −43.9745 |
| S10 | Aspheric | −34.6311 | 0.0579 | | | | −86.5052 |
| S11 | Aspheric | −4.9965 | 0.2500 | 1.55 | 56.1 | −4.69 | −66.0088 |
| S12 | Aspheric | 5.3489 | 0.0558 | | | | 13.7247 |
| S13 | Aspheric | 4.4177 | 0.4000 | 1.55 | 56.1 | 1.45 | 6.1141 |
| S14 | Aspheric | −0.9374 | 0.0500 | | | | −6.1172 |
| S15 | Aspheric | 1.0553 | 0.3500 | 1.68 | 19.2 | −2.17 | −4.1077 |
| S16 | Aspheric | 0.5321 | 0.4162 | | | | −2.9655 |
| S17 | Spherical | Infinite | 0.2100 | 1.52 | 64.2 | | |
| S18 | Spherical | Infinite | 0.1509 | | | | |
| S19 | Spherical | Infinite | | | | | |

TABLE 14

| Surface number | A4 | A6 | A8 | A10 | A12 | A14 | A16 | A18 | A20 |
|---|---|---|---|---|---|---|---|---|---|
| S1 | 3.0159E−01 | −4.8751E−02 | 8.0530E−03 | −6.1533E−04 | 6.7381E−04 | −1.1121E−04 | 5.2665E−05 | 9.0667E−06 | 1.9667E−05 |
| S2 | 1.8249E−01 | 5.1909E−03 | 3.5768E−03 | 1.1626E−03 | 6.6327E−04 | 2.9825E−04 | 1.2529E−04 | 4.0923E−05 | 9.2961E−06 |
| S3 | −2.3881E−02 | −6.3317E−03 | −1.5439E−03 | −6.2166E−04 | −3.5984E−04 | −2.0287E−04 | −1.1408E−04 | −4.9500E−05 | −1.8459E−05 |
| S4 | −5.8316E−02 | −8.0819E−03 | −3.2721E−04 | −2.3033E−04 | 1.3781E−05 | −5.0005E−05 | 1.4712E−05 | −5.0214E−06 | −5.3622E−07 |
| S5 | −2.3904E−01 | −6.8590E−03 | −8.9907E−04 | −4.9380E−05 | −7.1813E−04 | −6.7774E−04 | −1.9897E−04 | −9.2455E−05 | −7.7203E−06 |
| S6 | −7.7405E−02 | −4.3336E−03 | 7.4767E−03 | −3.0205E−03 | −7.8455E−04 | −6.9036E−04 | 1.2924E−04 | −2.8953E−05 | 1.7969E−05 |
| S7 | 5.2226E−02 | −1.9251E−03 | 6.7293E−03 | −2.1644E−03 | −1.6868E−04 | 9.1779E−05 | 2.4849E−06 | 3.8596E−06 | −9.8469E−06 |
| S8 | −5.3039E−02 | −1.1959E−02 | −3.8508E−03 | −1.9629E−03 | 2.4991E−03 | −8.4408E−05 | 6.0227E−04 | −9.3580E−05 | 3.8138E−05 |
| S9 | 5.3748E−02 | 1.7509E−02 | −1.3680E−03 | −3.9677E−03 | 2.4869E−03 | −1.3662E−03 | 3.8423E−04 | −1.1645E−04 | 2.8595E−06 |
| S10 | −7.7821E−02 | 9.8033E−03 | 2.1768E−02 | −1.0186E−02 | −7.1795E−04 | 2.7362E−03 | −2.4786E−03 | 3.6423E−04 | 1.6337E−04 |
| S11 | 6.6418E−02 | −4.2756E−02 | −3.7325E−03 | −6.3816E−03 | −5.2482E−03 | 5.8413E−03 | −1.6627E−03 | 7.4930E−04 | 2.3760E−05 |
| S12 | −5.0696E−01 | 1.1859E−01 | −3.6095E−02 | −2.1212E−02 | −4.6494E−03 | 2.3920E−03 | −3.8869E−04 | 5.8888E−04 | −5.9163E−04 |
| S13 | −4.8385E−01 | −7.3142E−02 | 5.5066E−02 | 1.6932E−02 | 4.4096E−04 | −6.9610E−03 | 9.8453E−04 | 3.0435E−03 | 9.4056E−04 |
| S14 | 2.9107E−01 | −1.6345E−01 | 2.0474E−02 | 4.3058E−02 | −4.6775E−03 | 4.8798E−04 | 4.8090E−04 | −1.8361E−03 | −1.3388E−03 |
| S15 | −1.0977E+00 | 1.6139E−01 | −8.3180E−03 | 2.0509E−02 | −4.7396E−03 | −2.3909E−03 | −1.1208E−03 | −1.5466E−03 | −3.1702E−04 |
| S16 | −1.2801E+00 | 1.8257E−01 | −7.9715E−02 | 4.4747E−02 | −1.0392E−02 | 6.8604E−03 | −4.0969E−03 | 1.5226E−04 | −8.0010E−04 |

Figure 14A:
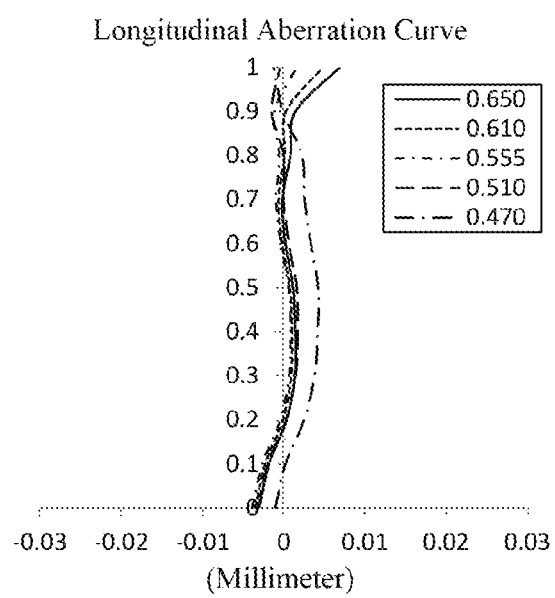
FIGS. 14A to 14D illustrate a longitudinal aberration curve, an astigmatic curve, a distortion curve, and a lateral color curve of the optical imaging lens assembly of the example 7, respectively.
Figure 14B:
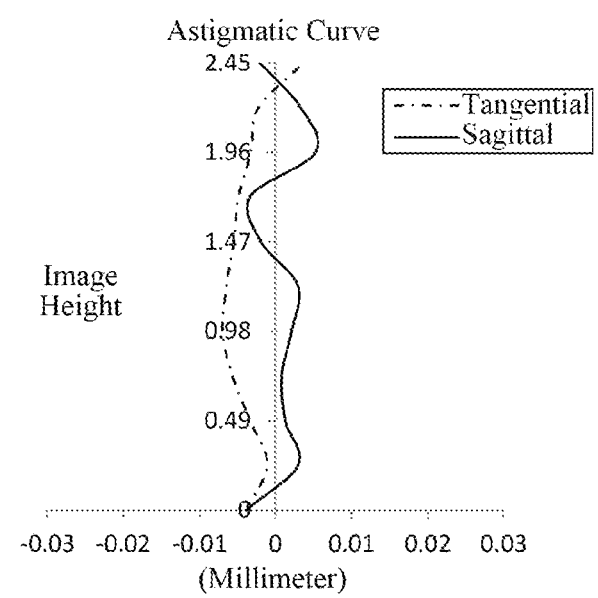
Figure 14C:
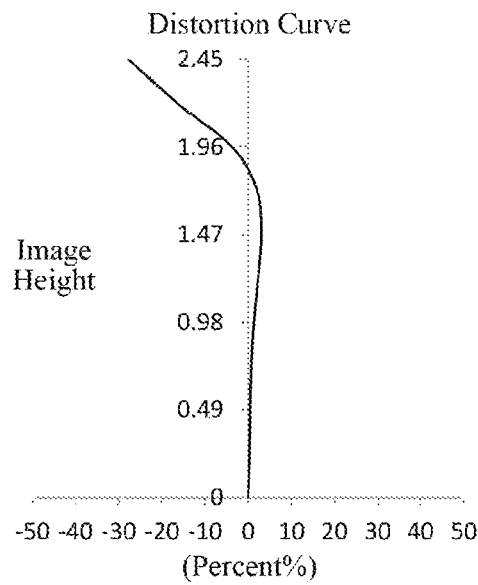
Figure 14D:
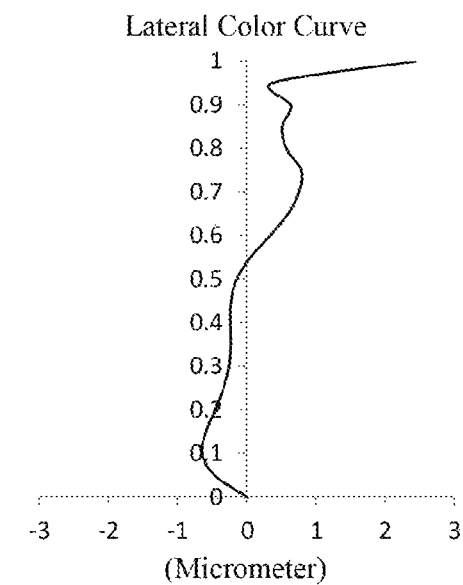

FIG. 14A illustrates a longitudinal aberration curve of the optical imaging lens assembly according to example 7, representing deviations of focal points converged by light of different wavelengths after passing through the lens assembly. FIG. 14B illustrates an astigmatic curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion corresponding to different image heights. FIG. 14D illustrates a lateral color curve of the optical imaging lens assembly according to example 7, representing deviations of different image heights on an imaging plane after light passes through the lens assembly. It can be seen from FIG. 14A to FIG. 14D that the optical imaging lens assembly provided in example 7 may achieve good image quality.

Example 8

Figure 15:
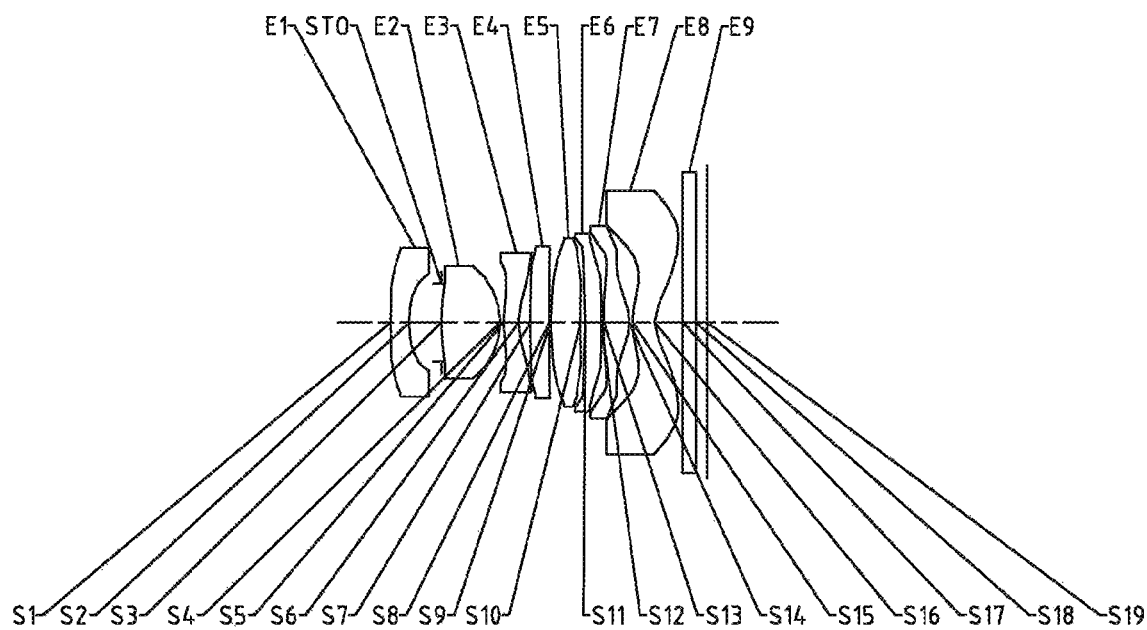
FIG. 15 illustrates a schematic structural view of an optical imaging lens assembly according to example 8 of the present disclosure.

An optical imaging lens assembly according to example 8 of the present disclosure is described below with reference to FIG. 15 to FIG. 16D. FIG. 15 shows a schematic structural view of the optical imaging lens assembly according to example 8 of the present disclosure.

As shown in FIG. 15, the optical imaging lens assembly includes a first lens E1, a stop STO, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a concave surface, and an image-side surface S12 thereof is a concave surface. The seventh lens E7 has positive refractive power, an object-side surface S13 thereof is a concave surface, and an image-side surface S14 thereof is a convex surface. The eighth lens E8 has negative refractive power, an object-side surface S15 thereof is a convex surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 1.81 mm, a total length TTL of the optical imaging lens assembly is 4.97 mm, half of a diagonal length ImgH of an effective pixel area on the imaging plane S19 of the optical imaging lens assembly is 2.45 mm, and half of a maximal field-of-view Semi-FOV of the optical imaging lens assembly is 61.7°.

Table 15 is a table illustrating basic parameters of the optical imaging lens assembly of example 8, wherein the units for the radius of curvature, the thickness/distance and the focal length are millimeter (mm). Table 16 shows high-order coefficients applicable to each aspheric surface in example 8, wherein the surface shape of each aspheric surface may be defined by the formula (1) given in the above example 1.

TABLE 15

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | 700.0000 | | | | |
| S1 | Aspheric | −7.4093 | 0.2900 | 1.54 | 55.6 | −3.87 | 0.0000 |
| S2 | Aspheric | 2.9269 | 0.5068 | | | | −16.3545 |
| STO | Spherical | Infinite | −0.0028 | | | | |
| S3 | Aspheric | 3.5551 | 0.9287 | 1.55 | 56.1 | 1.61 | 22.8864 |

TABLE 15-continued

| Surface number | Surface type | Radius of curvature | Thickness/ Distance | Material Refractive index | Abbe number | Focal length | Conic coefficient |
|---|---|---|---|---|---|---|---|
| S4 | Aspheric | −1.0590 | 0.0500 | | | | −2.3025 |
| S5 | Aspheric | 2.2569 | 0.2390 | 1.68 | 19.2 | −3.85 | −0.2937 |
| S6 | Aspheric | 1.1588 | 0.1811 | | | | −8.8097 |
| S7 | Aspheric | −65.0000 | 0.2987 | 1.55 | 56.1 | −25.67 | −99.0000 |
| S8 | Aspheric | 17.8923 | 0.0200 | | | | 84.0043 |
| S9 | Aspheric | 3.2345 | 0.4727 | 1.55 | 56.1 | 5.54 | −68.9093 |
| S10 | Aspheric | −43.5915 | 0.0739 | | | | −99.0000 |
| S11 | Aspheric | −4.0309 | 0.2501 | 1.55 | 56.1 | −4.19 | −69.4596 |
| S12 | Aspheric | 5.3949 | 0.0425 | | | | 13.8797 |
| S13 | Aspheric | −50.0000 | 0.4000 | 1.55 | 56.1 | 1.41 | 99.0000 |
| S14 | Aspheric | −0.7578 | 0.0500 | | | | −4.5657 |
| S15 | Aspheric | 1.1418 | 0.3500 | 1.68 | 19.2 | −1.91 | −3.5719 |
| S16 | Aspheric | 0.5315 | 0.4403 | | | | −3.9047 |
| S17 | Spherical | Infinite | 0.2100 | 1.52 | 64.2 | | |
| S18 | Spherical | Infinite | 0.1722 | | | | |
| S19 | Spherical | Infinite | | | | | |

TABLE 16

| Surface number | A4 | A6 | A8 | A10 | A12 | A14 | A16 | A18 | A20 |
|---|---|---|---|---|---|---|---|---|---|
| S1 | 2.9198E−01 | −4.7098E−02 | 7.3464E−03 | −1.1498E−03 | 4.8954E−04 | −1.4345E−04 | 1.5208E−05 | −2.0931E−05 | 7.9249E−06 |
| S2 | 1.7259E−01 | 1.1009E−03 | 2.0988E−03 | 3.3179E−04 | 1.9521E−04 | 7.1436E−05 | 3.1339E−05 | 1.1547E−05 | 2.1455E−06 |
| S3 | −2.2381E−02 | −4.9196E−03 | −8.6837E−04 | −2.0892E−04 | −7.0641E−05 | −2.5302E−05 | −1.3654E−05 | −6.4438E−06 | −4.4882E−06 |
| S4 | −4.9172E−02 | −7.0778E−03 | 5.6786E−05 | −1.0026E−04 | −2.3241E−05 | −4.1928E−07 | −6.9767E−06 | 3.8757E−06 | −1.2352E−06 |
| S5 | −2.2498E−01 | −3.2059E−03 | −1.0841E−03 | 1.0815E−03 | −3.6877E−04 | −2.1803E−04 | −1.6729E−04 | −2.5720E−05 | −1.5916E−05 |
| S6 | −6.6015E−02 | −4.8138E−03 | 7.3890E−03 | −1.7950E−03 | −1.5085E−03 | −5.0644E−04 | 2.3951E−05 | 6.8249E−05 | −2.7365E−06 |
| S7 | 5.8399E−02 | −6.7302E−03 | 8.9737E−03 | −9.5338E−04 | −1.3697E−03 | 2.0109E−04 | 5.8746E−05 | 3.6773E−06 | −9.6065E−06 |
| S8 | −2.3855E−02 | −9.5540E−03 | −1.9498E−03 | −9.7329E−05 | 1.3033E−03 | 1.7133E−04 | 7.1556E−04 | −9.1980E−05 | 9.3145E−06 |
| S9 | 5.5463E−02 | 2.2175E−02 | −2.6224E−03 | −4.1804E−03 | 2.9345E−03 | −1.3009E−03 | 3.3869E−04 | −6.7507E−05 | 2.9267E−06 |
| S10 | −6.3775E−02 | −4.5860E−03 | 1.5355E−02 | −1.5668E−02 | −1.0673E−03 | 4.2459E−03 | −1.3516E−03 | −2.5117E−04 | 2.2491E−04 |
| S11 | 7.2945E−02 | −4.3043E−02 | −8.9270E−03 | −6.7113E−03 | −2.9385E−03 | −1.3654E−05 | −1.3963E−03 | 5.8208E−04 | 3.1715E−04 |
| S12 | −5.5215E−01 | 8.5139E−02 | −2.1650E−02 | −2.0966E−02 | −7.4747E−03 | −1.6613E−04 | 1.6509E−05 | 2.5480E−03 | −5.2523E−04 |
| S13 | −1.4992E−01 | −1.1845E−01 | 7.4279E−02 | 2.1654E−02 | 8.6397E−03 | −3.0897E−03 | 5.4561E−03 | 5.2168E−03 | 6.1008E−04 |
| S14 | 3.8260E−01 | −1.7432E−01 | 2.0659E−02 | 4.3320E−02 | −7.1346E−03 | 2.4978E−04 | 1.8229E−03 | −1.8597E−03 | −1.3578E−03 |
| S15 | −1.1254E+00 | 1.4394E−01 | 2.8166E−03 | 1.8285E−02 | −5.0778E−03 | −1.0131E−03 | −1.5991E−03 | −8.7488E−04 | −5.5776E−04 |
| S16 | −1.0974E+00 | 1.0418E−01 | −2.8611E−02 | 2.5167E−02 | −2.7868E−03 | −1.2495E−04 | −3.0011E−03 | −1.1152E−03 | −5.0959E−04 |

Figure 16A:
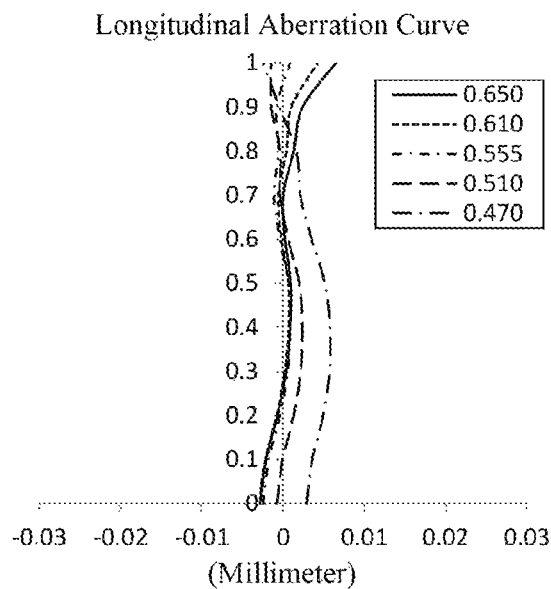
FIGS. 16A to 16D illustrate a longitudinal aberration curve, an astigmatic curve, a distortion curve, and a lateral color curve of the optical imaging lens assembly of the example 8, respectively.
Figure 16B:
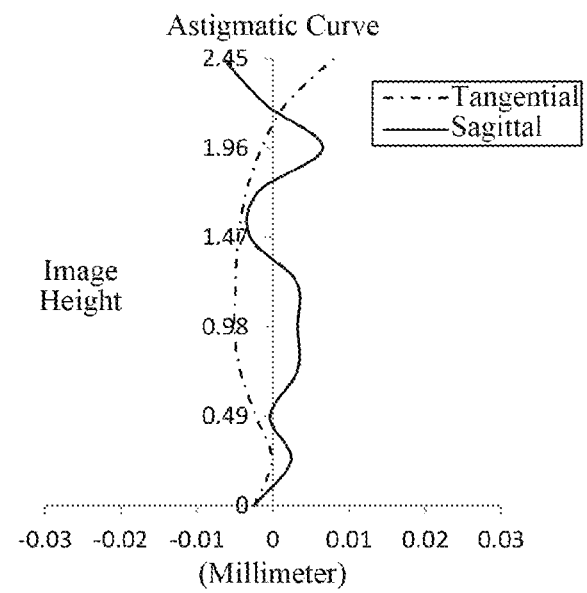
Figure 16C:
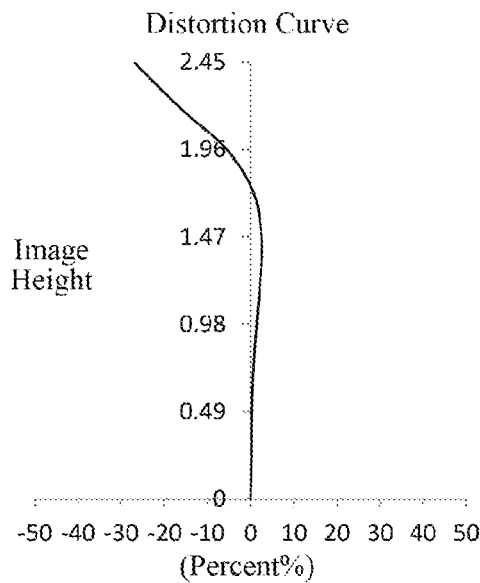
Figure 16D:
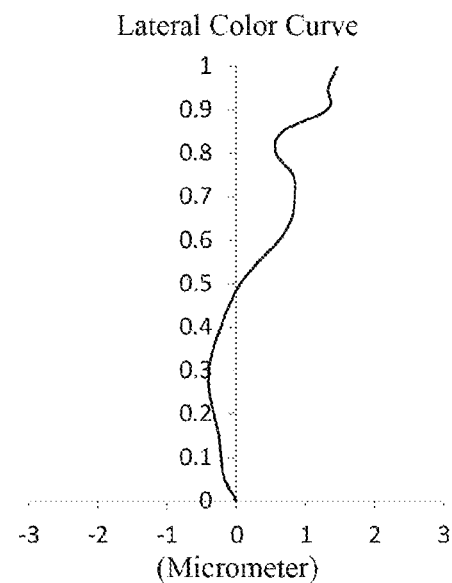

FIG. 16A illustrates a longitudinal aberration curve of the optical imaging lens assembly according to example 8, representing deviations of focal points converged by light of different wavelengths after passing through the lens assembly. FIG. 16B illustrates an astigmatic curve of the optical imaging lens assembly according to example 8, representing a curvature of a tangential plane and a curvature of a sagittal plane. FIG. 16C illustrates a distortion curve of the optical imaging lens assembly according to example 8, representing amounts of distortion corresponding to different image heights. FIG. 16D illustrates a lateral color curve of the optical imaging lens assembly according to example 8, representing deviations of different image heights on an imaging plane after light passes through the lens assembly. It can be seen from FIG. 16A to FIG. 16D that the optical imaging lens assembly provided in example 8 may achieve good image quality.

In view of the above, examples 1 to 8 respectively satisfy the relationship shown in Table 17.

TABLE 17

| Condition/ Example | 1 | 2 | 3 | 4 | 5 | 6 | 7 | 8 |
|---|---|---|---|---|---|---|---|---|
| f/EPD | 1.80 | 1.80 | 1.80 | 1.80 | 1.79 | 1.78 | 1.76 | 1.78 |
| (f6 + f2)/f | −2.20 | −2.44 | −2.56 | −3.28 | −2.13 | −2.07 | −1.82 | −1.43 |
| f1/f | −2.34 | −2.33 | −2.17 | −2.18 | −2.03 | −2.11 | −2.20 | −2.14 |
| f3/f | −2.36 | −2.16 | −2.13 | −2.12 | −2.53 | −2.39 | −2.29 | −2.13 |
| f6/f | −3.23 | −3.42 | −3.53 | −4.24 | −3.05 | −2.95 | −2.71 | −2.31 |
| |f8|/f7 | 1.00 | 1.50 | 1.50 | 1.45 | 1.44 | 1.45 | 1.49 | 1.36 |
| (R15 + R16)/R14 | −1.35 | −1.41 | −1.48 | −1.51 | −1.55 | −1.72 | −1.69 | −2.21 |
| |R1|/(R2 + R3) | 1.30 | 1.04 | 1.04 | 1.14 | 1.26 | 1.35 | 1.31 | 1.14 |
| R6/(R4 + R5) | 0.80 | 0.78 | 0.82 | 0.85 | 0.90 | 0.76 | 0.76 | 0.97 |
| T12/ΣAT | 0.60 | 0.57 | 0.56 | 0.56 | 0.51 | 0.52 | 0.53 | 0.55 |
| CT2/CT1 | 2.94 | 3.08 | 3.16 | 3.19 | 3.35 | 3.18 | 3.16 | 3.20 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
    a first lens having negative refractive power with a concave object-side surface and a concave image-side surface;
    a second lens having refractive power;
    a third lens having negative refractive power;
    a fourth lens having refractive power;
    a fifth lens having refractive power;
    a sixth lens having refractive power with a concave object-side surface and a concave image-side surface;
    a seventh lens having refractive power; and
    an eighth lens having refractive power,
    wherein Semi-FOV≥60°,
    where Semi-FOV is half of a maximal field-of-view of the optical imaging lens assembly.

2. The optical imaging lens assembly according to claim 1, wherein −3.5<(f6+f2)/f<−1.0,
    where f is a total effective focal length of the optical imaging lens assembly, f2 is an effective focal length of the second lens, and f6 is an effective focal length of the sixth lens.

3. The optical imaging lens assembly according to claim 1, wherein −2.5<f1/f<−2.0,
    where f1 is an effective focal length of the first lens, and f is a total effective focal length of the optical imaging lens assembly.

4. The optical imaging lens assembly according to claim 1, wherein −3.0<f3/f<−2.0,
    where f is a total effective focal length of the optical imaging lens assembly, and f3 is an effective focal length of the third lens.

5. The optical imaging lens assembly according to claim 1, wherein −4.5<f6/f<−2.0,
    where f is a total effective focal length of the optical imaging lens assembly, and f6 is an effective focal length of the sixth lens.

6. The optical imaging lens assembly according to claim 1, wherein 1.0≤|f8|/f7≤1.5,
    where f7 is an effective focal length of the seventh lens, and f8 is an effective focal length of the eighth lens.

7. The optical imaging lens assembly according to claim 1, wherein −2.5<(R15+R16)/R14<−1.0,
    where R14 is a radius of curvature of an image-side surface of the seventh lens, R15 is a radius of curvature of an object-side surface of the eighth lens, and R16 is a radius of curvature of an image-side surface of the eighth lens.

8. The optical imaging lens assembly according to claim 1, wherein 1.0<|R1|/(R2+R3)<1.5,
    where R1 is a radius of curvature of the object-side surface of the first lens, R2 is a radius of curvature of the image-side surface of the first lens, and R3 is a radius of curvature of an object-side surface of the second lens.

9. The optical imaging lens assembly according to claim 1, wherein 0.5<R6/(R4+R5)<1.0,
    where R4 is a radius of curvature of an image-side surface of the second lens, R5 is a radius of curvature of an object-side surface of the third lens, and R6 is a radius of curvature of an image-side surface of the third lens.

10. The optical imaging lens assembly according to claim 1, wherein 0<T12/ΣAT<1.0,
    where T12 is a spaced interval between the first lens and the second lens along the optical axis, and ΣAT is a sum of spaced intervals along the optical axis of each two adjacent lenses from the first lens to the eighth lens.

11. The optical imaging lens assembly according to claim 1, wherein 2.5<CT2/CT1<3.5,
    where CT1 is a center thickness of the first lens along the optical axis, and CT2 is a center thickness of the second lens along the optical axis.

12. The optical imaging lens assembly according to claim 1, wherein f/EPD≤1.8,
    where f is a total effective focal length of the optical imaging lens assembly, and EPD is an entrance pupil diameter of the optical imaging lens assembly.

13. An optical imaging lens assembly, comprising: a first lens, a second lens, a third lens, a fourth lens, a fifth lens, a sixth lens, a seventh lens and an eighth lens, which are sequentially arranged from an object side to an image side of the optical imaging lens assembly along an optical axis,
    wherein, the second lens has positive refractive power, and the sixth lens has negative refractive power,
    wherein, −3.5<(f6+f2)/f<−1.0, where f is a total effective focal length of the optical imaging lens assembly, f2 is an effective focal length of the second lens, and f6 is an effective focal length of the sixth lens,
    wherein −2.5<(R15+R16)/R14<−1.0,
    where R14 is a radius of curvature of the image-side surface of the seventh lens, R15 is a radius of curvature of the object-side surface of the eighth lens, and R16 is a radius of curvature of the image-side surface of the eighth lens.

14. The optical imaging lens assembly according to claim 13, wherein each of the first lens and the third lens has negative refractive power,
    wherein −2.5<f1/f<−2.0, and
    −3.0<f3/f<−2.0,
    where f1 is an effective focal length of the first lens, f is a total effective focal length of the optical imaging lens assembly, and f3 is an effective focal length of the third lens.

15. The optical imaging lens assembly according to claim 13, wherein an image-side surface of the seventh lens is convex, an object-side surface of the eighth lens is convex, and an image-side surface of the eighth lens is concave.

16. The optical imaging lens assembly according to claim 13, wherein an image-side surface of the second lens is convex, an object-side surface of the third lens is convex, and an image-side surface of the third lens is concave.

17. The optical imaging lens assembly according to claim 16, wherein $0.5 < R6/(R4+R5) < 1.0$,
where R4 is a radius of curvature of the image-side surface of the second lens, R5 is a radius of curvature of the object-side surface of the third lens, and R6 is a radius of curvature of the image-side surface of the third lens.

18. The optical imaging lens assembly according to claim 13, wherein the object-side surface of the second lens is convex, and an image-side surface of the fourth lens is concave.

* * * * *